United States Patent
Ito

(10) Patent No.: US 10,054,828 B2
(45) Date of Patent: Aug. 21, 2018

(54) LIQUID CRYSTAL DISPLAY APPARATUS

(71) Applicant: NLT Technologies, Ltd., Kawasaki, Kanagawa (JP)

(72) Inventor: Hideki Ito, Kawasaki (JP)

(73) Assignee: NLT Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 15/440,814

(22) Filed: Feb. 23, 2017

(65) Prior Publication Data

US 2017/0255067 A1   Sep. 7, 2017

(30) Foreign Application Priority Data

Mar. 1, 2016   (JP) .................................. 2016-39266

(51) Int. Cl.
*G02F 1/1343*  (2006.01)
*G02F 1/1333*  (2006.01)
(Continued)

(52) U.S. Cl.
CPC .... *G02F 1/134309* (2013.01); *G02F 1/13306* (2013.01); *G02F 1/13439* (2013.01);
(Continued)

(58) Field of Classification Search
CPC ........... G02F 1/134363; G02F 1/13306; G02F 1/133345; G02F 1/13439; G02F 1/134309; G02F 2201/123; G02F 1/1343; G02F 1/136286; G02F 1/155; G02F 1/1393; G02F 1/1395; G02F 1/136; G02F 1/218; G02F 1/134327; G02F 1/133707;
(Continued)

(56) References Cited

U.S. PATENT DOCUMENTS 7,623,191 B2   11/2009   Liao et al.
2007/0002247 A1*  1/2007   Lee .................. G02F 1/134363
                                                349/141

(Continued)

FOREIGN PATENT DOCUMENTS

JP   2011-081385 A   4/2011

*Primary Examiner* — Edward Glick
*Assistant Examiner* — Shan Liu
(74) *Attorney, Agent, or Firm* — Sughrue Mion, PLLC

(57) ABSTRACT

A liquid crystal display apparatus comprises a first planar electrode, a first insulator layered over an upper surface of the first planar electrode, a planar pixel electrode layered over an upper surface of the first insulator, a second insulator layered over an upper surface of the pixel electrode, a second planar electrode that covers the pixel electrode and that is layered over an upper surface of the second insulator, and a liquid crystal layer disposed over an upper surface of the second planar electrode. The second planar electrode includes an aperture portion including a first region and a second region integrated with a first region, the first region is a region is overlapped with both the first planar electrode and the pixel electrode, the second region is overlapped with the first planar electrode and is not overlapped with the pixel electrode, and a first angle between a first side of the first region and a first virtual line dividing the aperture portion into the first region and the second region is equal to or smaller than 90 degrees.

12 Claims, 21 Drawing Sheets

(51) Int. Cl.
*G02F 1/133* (2006.01)
*G02F 1/1337* (2006.01)

(52) U.S. Cl.
CPC .. *G02F 1/133345* (2013.01); *G02F 1/133707* (2013.01); *G02F 1/134363* (2013.01); *G02F 2001/134318* (2013.01); *G02F 2001/134381* (2013.01); *G02F 2201/122* (2013.01); *G02F 2201/123* (2013.01); *G02F 2201/128* (2013.01)

(58) Field of Classification Search
CPC ............ G02F 1/134336; G02F 1/0316; G02F 2001/134318; G02F 2001/134372; G02F 2001/134381; G02F 2001/134345; G02F 2001/1357; G02F 2001/136218; G02F 2001/136295; G02F 2001/1552; G02F 2001/1555; G02F 2001/1557; G02F 2001/13629; G02F 2201/12; G02F 2201/121; G02F 2201/124; G02F 2201/122; G02F 2201/14; G02F 2202/10; G02F 1/133753; G02F 1/3775; G02F 1/1362; G02F 1/136209; G02F 1/136227; G02F 1/1365; G02F 1/1368; G02F 2001/136222; G02F 2001/136231; G02F 2001/13625; G02F 2001/1635; H01L 23/49534; H01L 2933/0016; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508; G09G 2300/0421; G09G 2300/0426; G09G 2300/0439; G09G 3/3659
USPC .............................. 349/139–148, 129, 42–43
See application file for complete search history.

(56) References Cited

U.S. PATENT DOCUMENTS

| | | | |
|---|---|---|---|
| 2009/0059110 A1* | 3/2009 | Sasaki | G02F 1/134363 349/39 |
| 2009/0225267 A1* | 9/2009 | Atarashiya | G02F 1/134363 349/139 |
| 2010/0079712 A1* | 4/2010 | Tanaka | G02F 1/133512 349/123 |
| 2010/0220255 A1* | 9/2010 | Song | G02F 1/134363 349/46 |
| 2011/0085121 A1 | 4/2011 | Jeon et al. | |
| 2011/0109861 A1* | 5/2011 | Son | G02F 1/136209 349/141 |
| 2011/0187976 A1* | 8/2011 | Tanno | G02F 1/134363 349/139 |
| 2014/0192307 A1* | 7/2014 | Yang | G02F 1/134336 349/138 |
| 2015/0060973 A1* | 3/2015 | Tsai | G02F 1/136213 257/309 |
| 2016/0062203 A1* | 3/2016 | Ono | G02F 1/134363 349/43 |
| 2017/0031215 A1* | 2/2017 | Yang | G02F 1/133707 |

* cited by examiner

F I G. 4
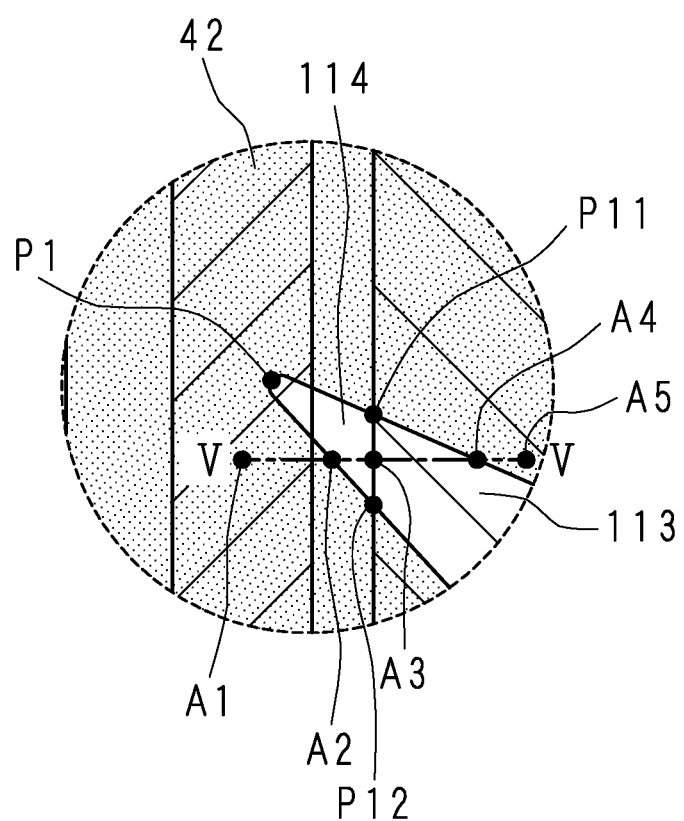

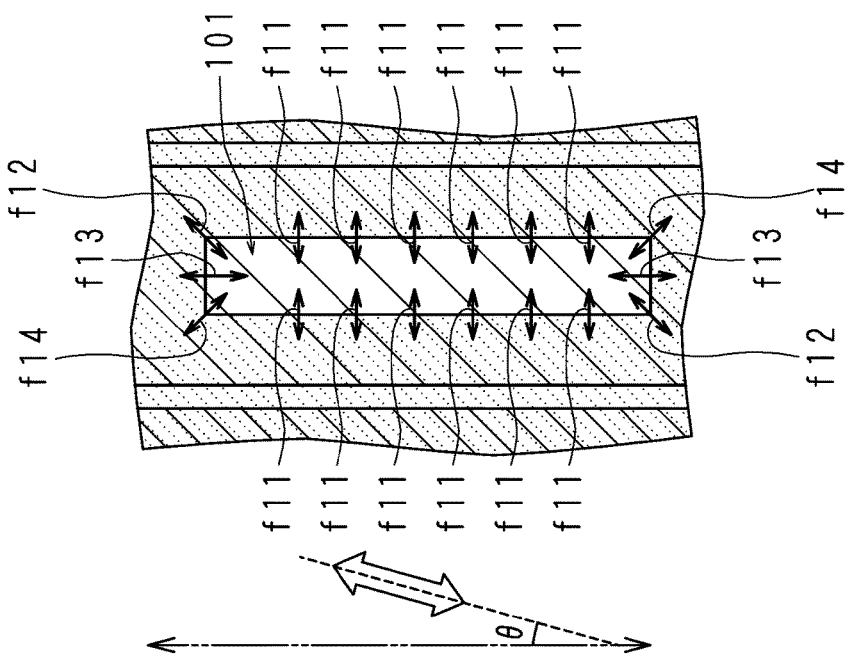
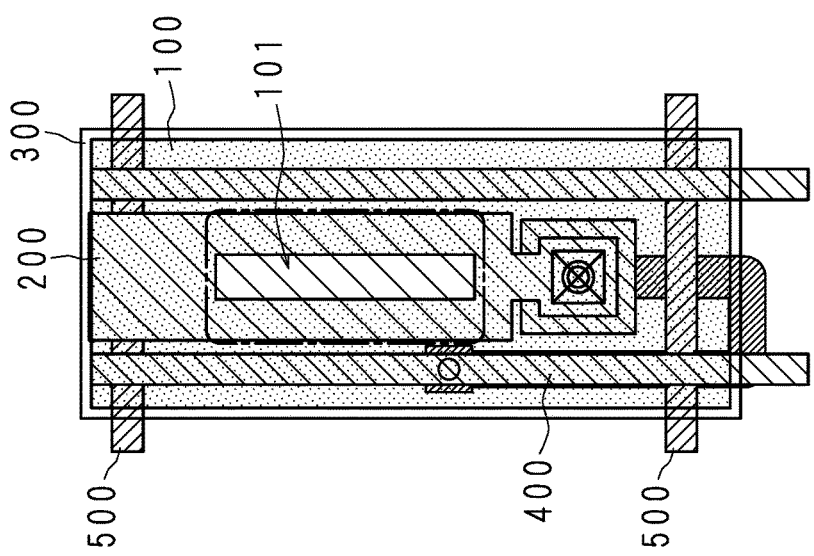

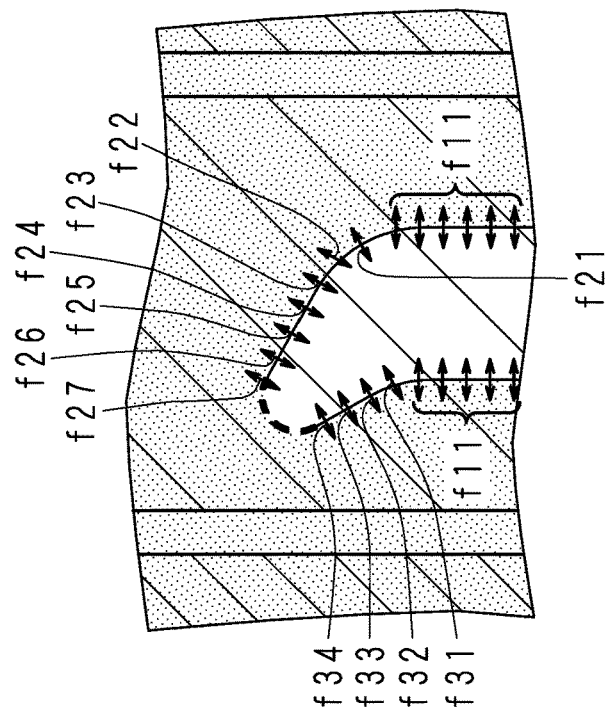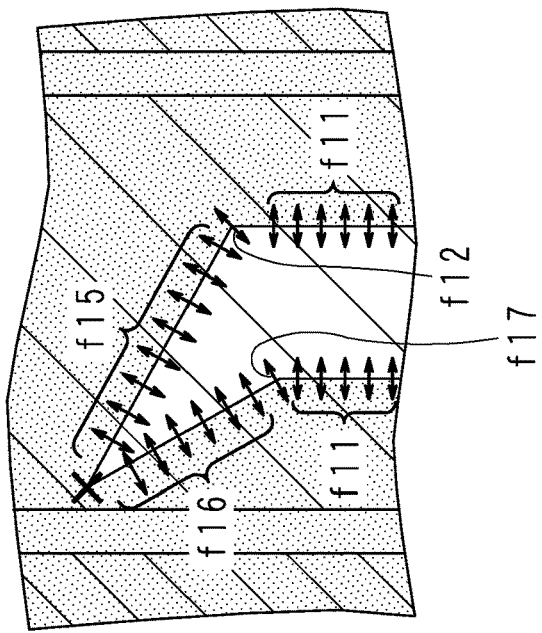

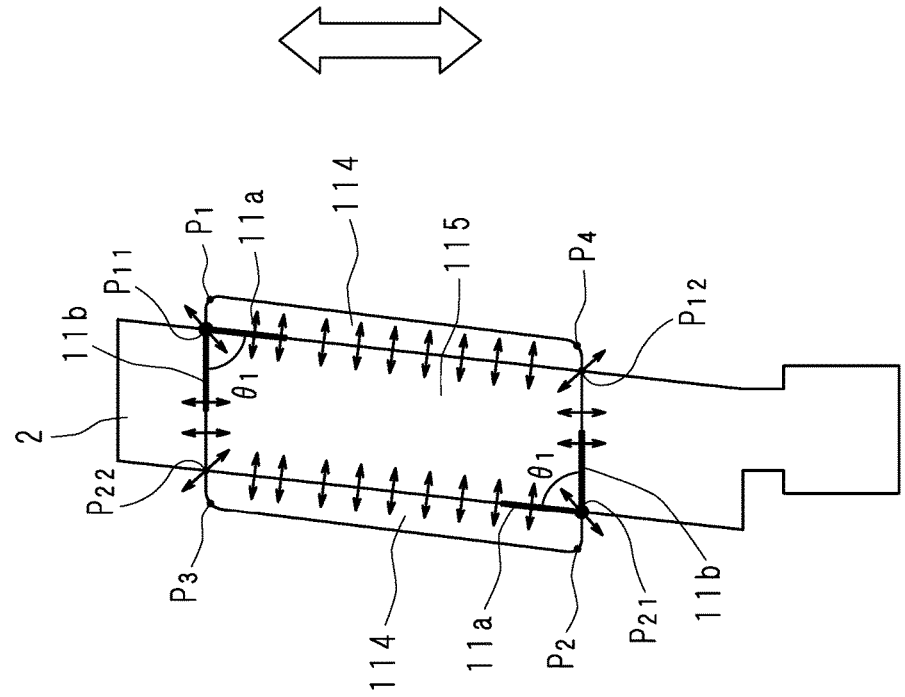
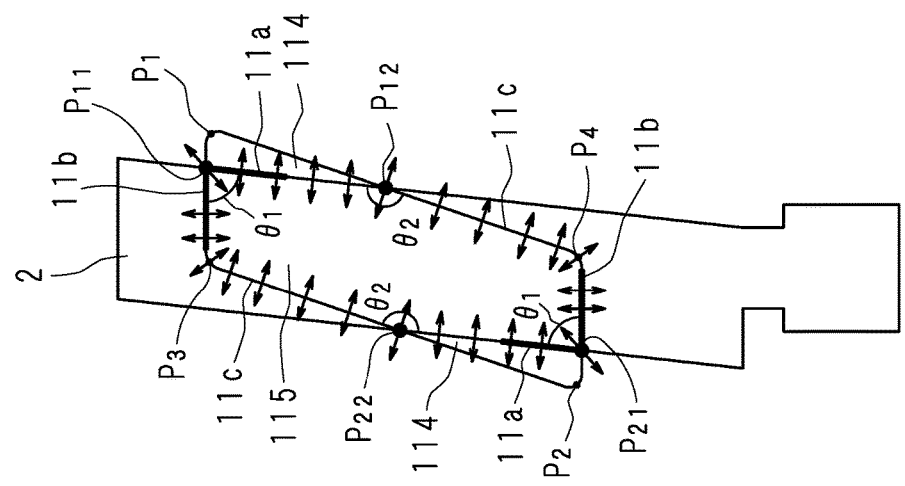

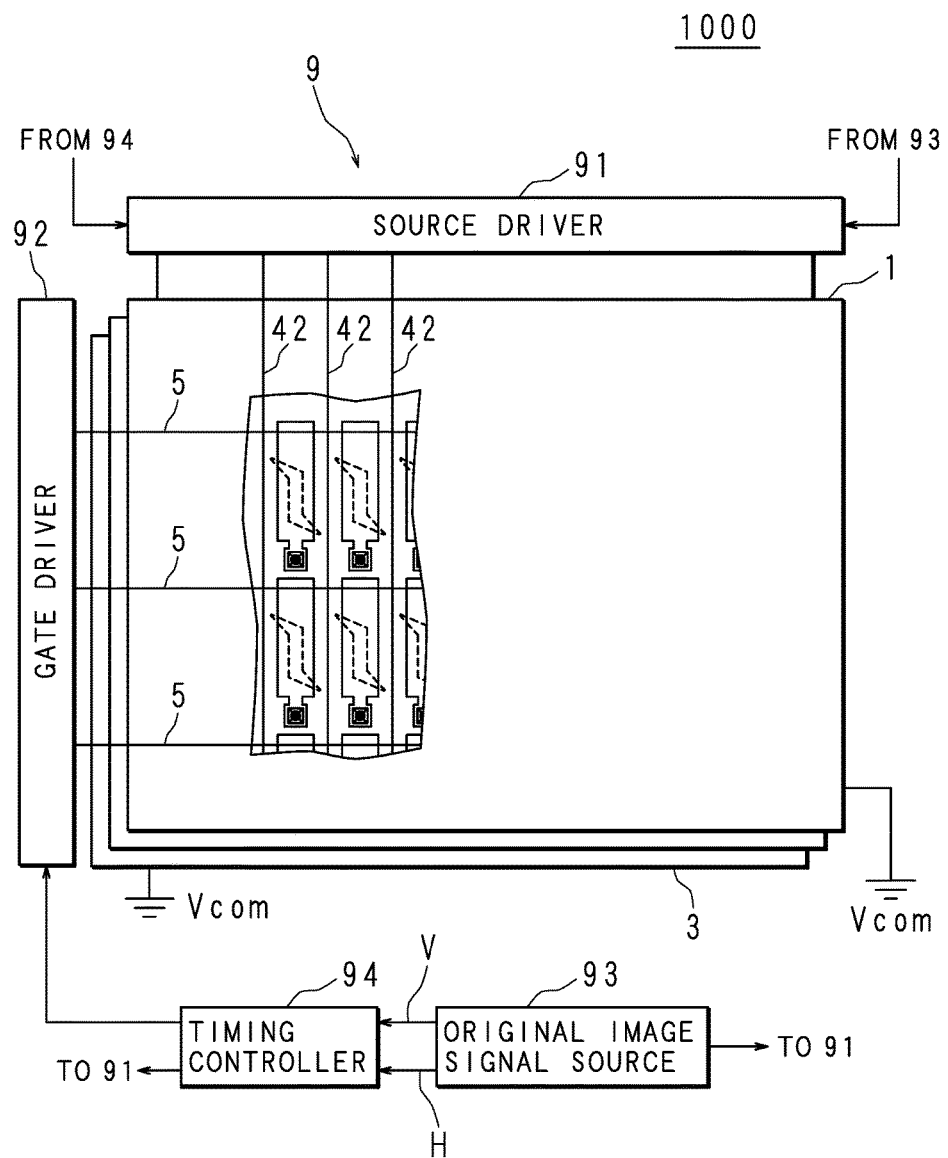
F I G. 21

LIQUID CRYSTAL DISPLAY APPARATUS

CROSS-REFERENCE TO RELATED APPLICATIONS

This non-provisional application claims priority under 35 U.S.C. § 119(a) on Patent Application No. 2016-039266 filed in Japan on Mar. 1, 2016, the entire contents of which are hereby incorporated by reference.

FIELD

The disclosure relates to a liquid crystal display apparatus.

BACKGROUND

In a liquid crystal display apparatus employing a thin film transistor (TFT) driving method, two typical operating modes, such as a vertical alignment (VA) mode and an in-plane switching (IPS) mode, have been proposed. Furthermore, a fringe field switching (FFS) mode, being the IPS mode improved in transmittance, has been proposed. Such types of the liquid crystal display apparatuses are disclosed in Japanese Patent Application Laid-Open Publication No. 2011-81385 and U.S. Pat. No. 7,623,191.

SUMMARY

In an IPS liquid crystal display apparatus, it has been widely known that a region (hereinafter, referred to as a "reverse rotation domain") where some liquid crystal molecules rotate in a direction reverse to a normal rotational direction of liquid crystal molecules occurs upon application of an electric field for liquid crystal driving. Such an occurrence of the reverse rotation domain decreases image quality.

According to an aspect of the present disclosure there is provided a liquid crystal display apparatus including: a first planar electrode; a first insulator layered over an upper surface of the first planar electrode; a planar pixel electrode layered over an upper surface of the first insulator; a second insulator layered over an upper surface of the pixel electrode; a second planar electrode that covers the pixel electrode and that is layered over an upper surface of the second insulator; and a liquid crystal layer disposed over an upper surface of the second planar electrode, wherein the second planar electrode includes an aperture portion including a first region and a second region integrated with a first region, the first region is overlapped with both the first planar electrode and the pixel electrode, the second region is overlapped with the first planar electrode and is not overlapped with the pixel electrode, and a first angle between a first side of the first region and a first virtual line dividing the aperture portion into the first region and the second region is equal to or smaller than 90 degrees.

The above and further objects and features will more fully be apparent from the following detailed description with accompanying drawings.

It is to be understood that both the foregoing general description and the following detailed description are exemplary and explanatory and are not restrictive of this disclosure.

BRIEF DESCRIPTION OF THE DRAWINGS

FIG. 4 is a partially enlarged view of FIG. 1;

FIG. 7A is an illustrative view explaining a comparative example;

FIG. 7B is an illustrative view explaining a comparative example;

FIG. 9A is a partially enlarged view of FIG. 8A;

FIG. 9B is a partially enlarged view of FIG. 8B;

FIG. 14A illustrates a state in which the pixel electrode and the aperture portion provided to the upper electrode are overlapped;

FIG. 14B illustrates a state in which the pixel electrode and the aperture portion provided to the upper electrode are overlapped;

FIG. 21 illustrates a configurational example of the driving circuit in the liquid crystal display apparatus.

DETAILED DESCRIPTION

Hereinafter, embodiments of a display apparatus will be described in detail with reference to the accompanying drawings.

(Embodiment 1)

Figure 1:
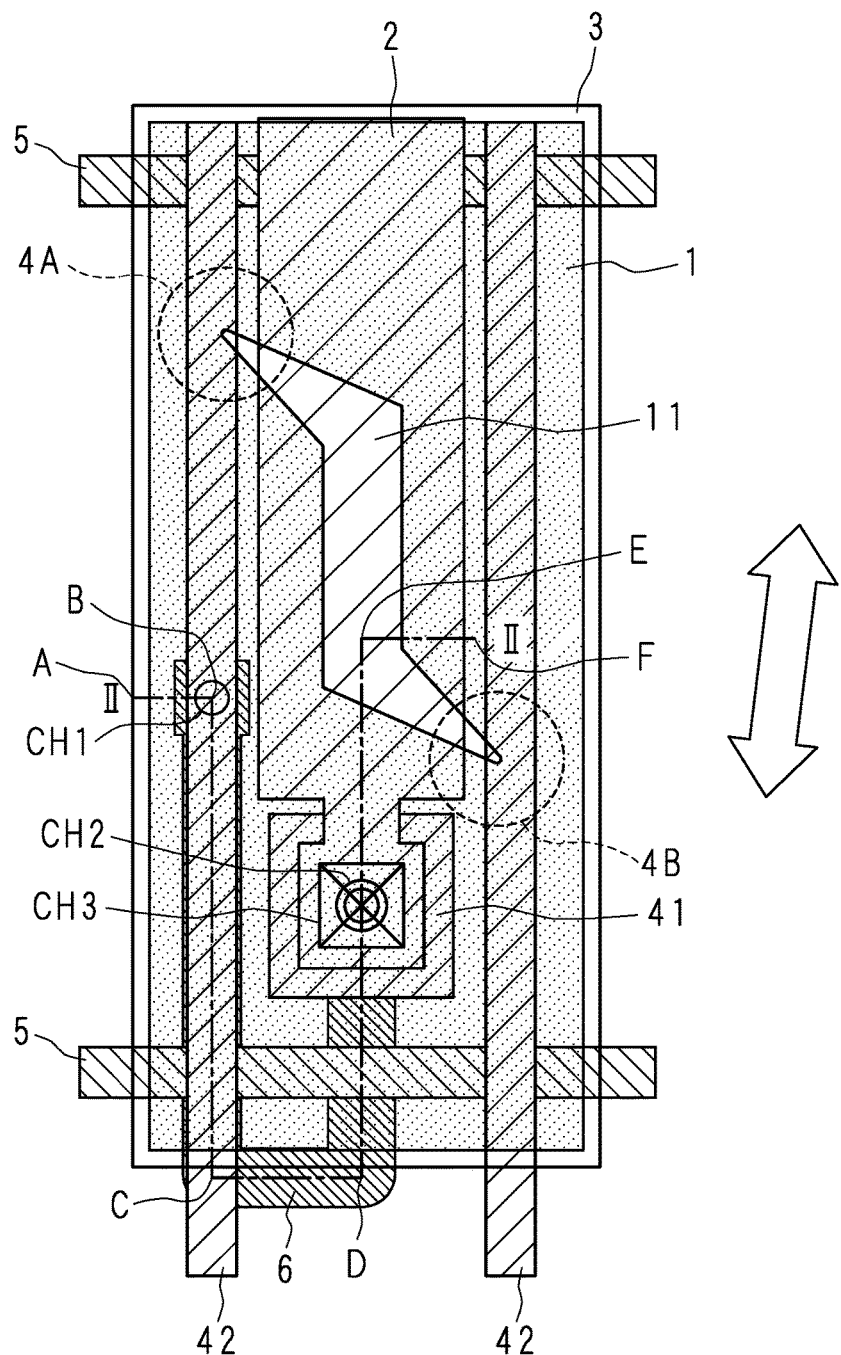
FIG. 1 is a plane view illustrating a configurational example of one pixel of the liquid crystal display apparatus.

FIG. 1 is a plane view illustrating a configurational example of one pixel of the liquid crystal display apparatus.

It is noted that the overall liquid crystal display apparatus is depicted in FIG. 21 as a liquid crystal display apparatus 1000. In the following drawings explaining a configurational example of a pixel of the liquid crystal display apparatus 1000 according to the present embodiment, the reference numeral 1000 will not be applied.

Figure 2:
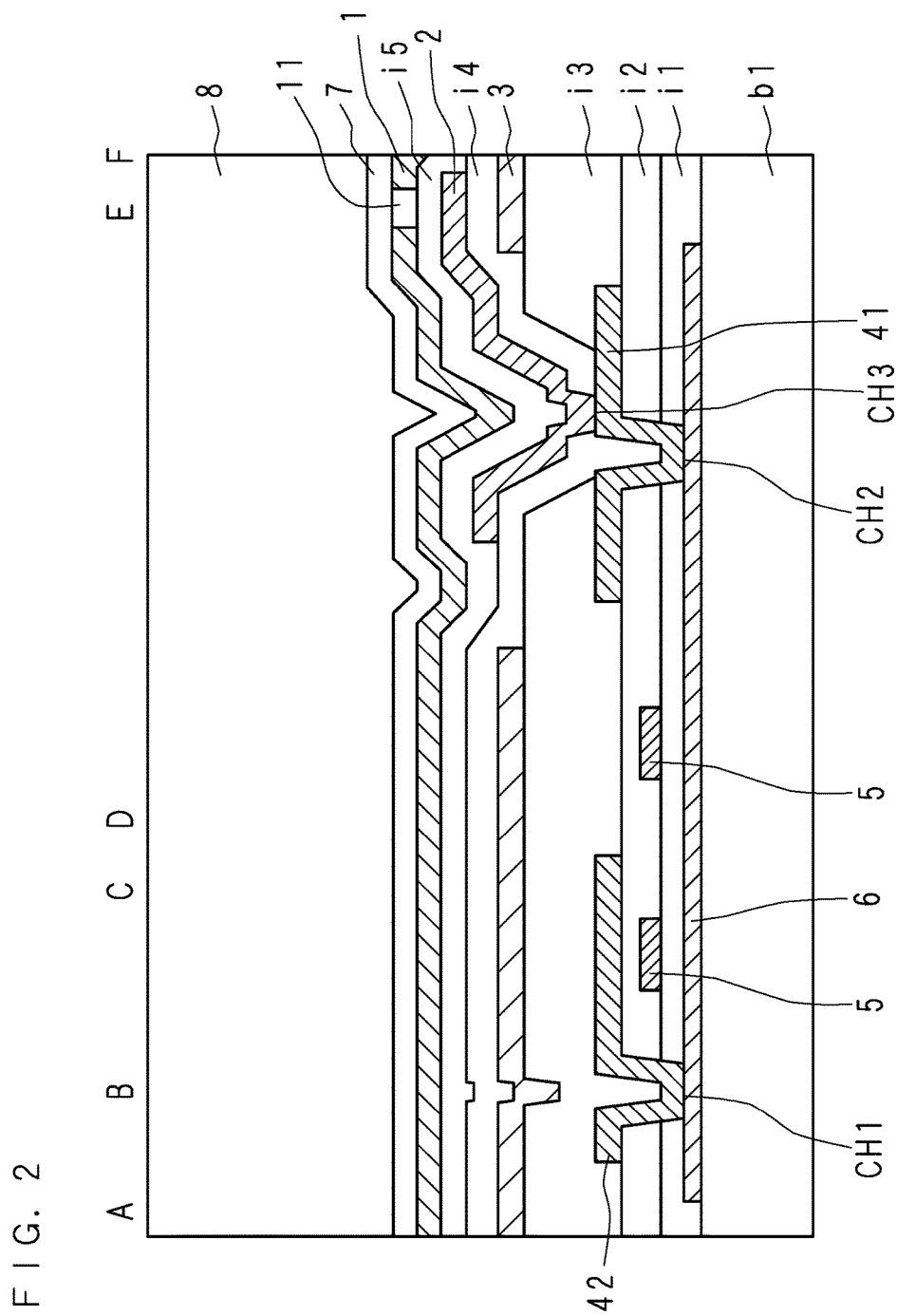
FIG. 2 is a cross-sectional view taken along the line II-II of FIG. 1.

FIG. 2 is a cross-sectional view taken along the line II-II of FIG. 1. It is noted that reference codes A, B, C, D, E, F denoted in FIG. 1 and FIG. 2 indicate positions on a section line depicted by dot-and-dash lines.

As shown in FIG. 1 and FIG. 2, a transparent substrate b1 (see FIG. 2) is provided with a plurality of gate lines 5 and a plurality of source lines 42. A region defined by the two adjacent gate lines 5 and the two adjacent source lines 42 is assumed as a pixel. Each pixel is formed with a lower common electrode 3 (hereinafter, referred to as a lower electrode 3), a pixel electrode 2 and an upper common electrode 1 (hereinafter, referred to as an upper electrode 1). The lower electrode 3 covers the gate lines 5 and the source lines 42. The pixel electrode 2 is elongated rectangular. The pixel electrode 2 is provided for each pixel. The upper electrode 1 covers the most part of the pixel electrode 2. A source electrode 41 is formed under the pixel electrode 2 at one end portion of the long side direction of the pixel electrode 2. The source electrode 41 and the source line 42 are electrically connected by a poly silicon (p-Si) pattern 6. The upper electrode 1 is provided with an aperture portion 11.

As shown in FIG. 2, the p-Si pattern 6, the gate line 5, the source electrode 41, the source line 42, the lower electrode 3, the pixel electrode 2 and the upper electrode 1 are layered in this order on the transparent substrate b1. Insulating layers i1 to i5 are interposed between the respective layers. The upper electrode 1 is entirely covered by an alignment film 7. A liquid crystal layer 8 is placed on the alignment film 7. Also, an outline arrow illustrated in FIG. 1 depicts a rubbing direction (also called an initial alignment direction) of liquid crystal molecules. According to the present embodiment, the rubbing direction is a long side direction of the pixel electrode 2. That is, the rubbing direction is parallel to or tilted to the right with respect to the wiring direction of the source line 42.

The source line 42 and the p-Si pattern 6 are connected via a contact hole CH1. The p-Si pattern 6 and the source electrode 41 are connected via a contact hole CH2. Furthermore, the source electrode 41 and the pixel electrode 2 are connected via a contact hole CH3.

Figure 3:
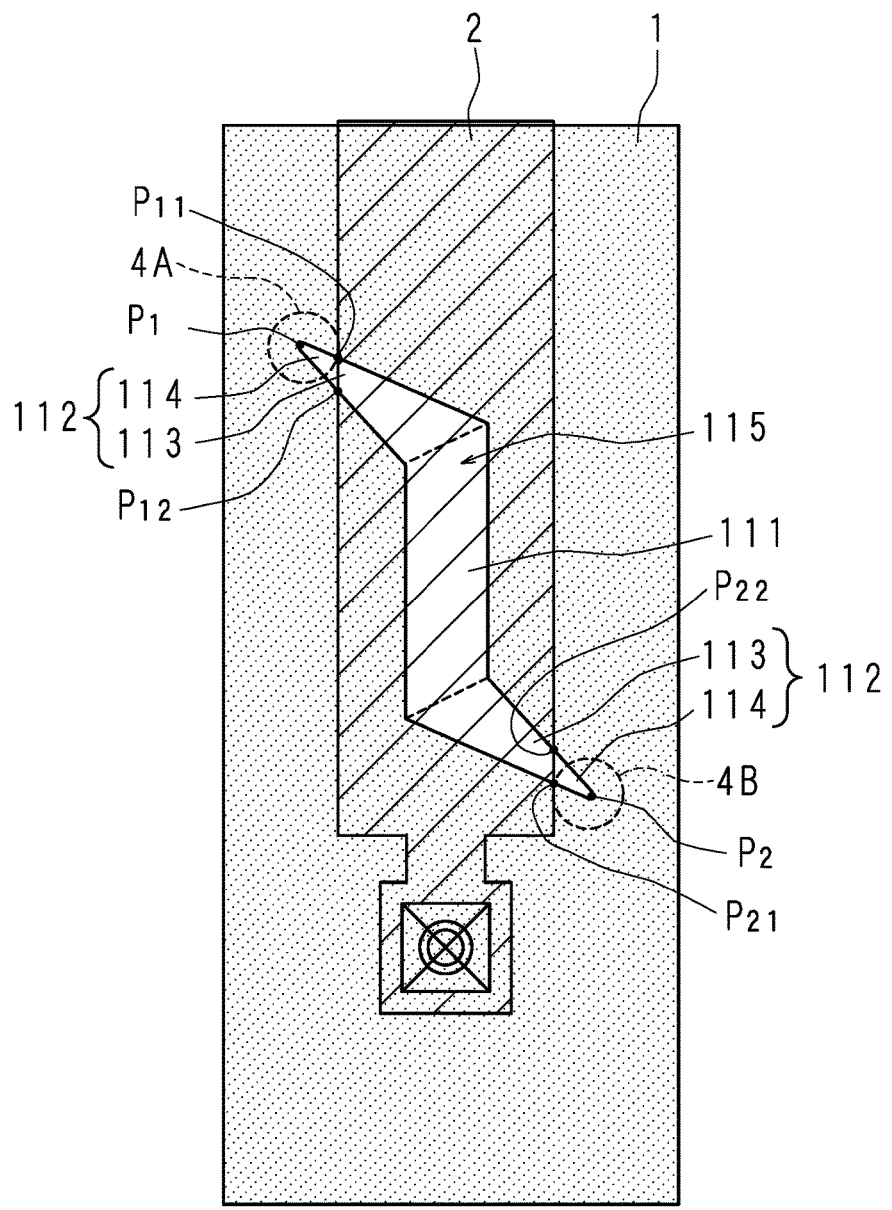
FIG. 3 is an illustrative view illustrating a state in which the upper electrode and the pixel electrode are overlapped.

FIG. 3 is an illustrative view illustrating a state in which the upper electrode 1 and the pixel electrode 2 are overlapped. The upper electrode 1 is provided with the aperture portion 11. The aperture portion 11 is hexagonal. More specifically, the aperture portion 11 has a central portion 111 and two triangular bent portions 112. The central portion 111 is parallelogram-shaped. The two triangular bent portions 112 are triangular. Each triangle is formed while regarding the short side of the central portion 111 as the base. The central portion 111 regards two long sides parallel to the long side direction of the pixel electrode 2 and with first and second short sides. The central portion 111 is entirely overlapped with the pixel electrode 2. The two triangular bent portions 112 are substantially the same in shape. The two triangular bent portions 112 are symmetrically disposed with respect to a predetermined point within the aperture portion 11.

The respective vertexes that face the above-described bases of the two triangular bent portions 112 are at positions beyond the different long sides of the pixel electrode 2 (positions where the pixel electrode is not overlapped). One of the two triangular bent portions 112 including vertex $P_1$ refered to a first triangular bent portion 112. The first triangular bent portion 112 includes the first short side and a first vertex $P_1$ opposite to the first short side. The first vertex $P_1$ is not overlapped with the pixel electrode 2. Another of the two triangular bent portions 112 including vertex $P_2$ refered to a second triangular bent portion 112. The second triangular bent portion 112 includes the second short side and a second vertex $P_2$ opposite to the second short side. The second vertex $P_2$ is not overlapped with the pixel electrode 2. The two triangular bent portions 112 each comprise an overlapped portion 113 and a non-overlapped portion 114. The overlapped portions 113 are quadrangular. The non-overlapped portions 114 are triangular. The vertexes of the triangles are $P_1$, $P_{11}$, $P_{12}$ and $P_2$, $P_{21}$, $P_{22}$. The second region 114 is triangular with one side being the first virtual line (ling segment $P_{11}P_{12}$ and $P_{21}P_{22}$) of the first region and sharing the other sides with the first or second triangular bent portion 112.

Figure 5:
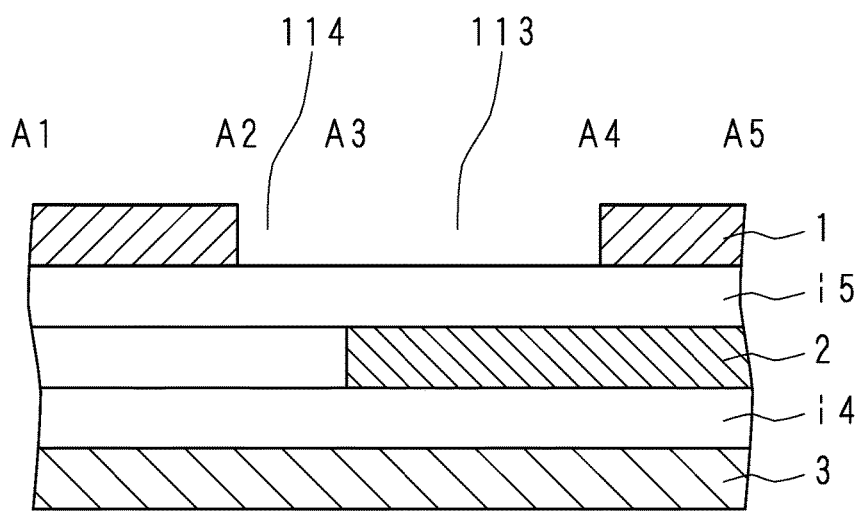
FIG. 5 is a cross-sectional view taken along the line V-V of FIG. 4.

The following description provides an overlap relationship between the overlapped portion 113 and the pixel electrode 2 and between the non-overlapped portion 114 and the pixel electrode 2. FIG. 4 is a partially enlarged view of FIG. 1. FIG. 4 illustrates a region denoted by the reference code 4A in FIG. 1. FIG. 5 is a cross-sectional view taken along the line V-V of FIG. 4. For simplifying the explanation, the upper electrode 1, an insulating layer i5, the pixel electrode 2, an insulating layer i4 and the lower electrode 3 are illustrated in cross-section.

The A1, A2, A3, A4 and A5 illustrated in FIG. 4 and FIG. 5 are reference codes indicating the positions on the section line depicted by dot-and-dash lines. As shown in FIG. 4 and FIG. 5, the overlapped portion 113 is overlapped with the pixel electrode 2. Furthermore, the non-overlapped portion 114 is not overlapped with the pixel electrode 2. Also, the overlapped portion 113 and the non-overlapped portion 114 are regions that are overlapped with the lower electrode 3. As can be understood from FIG. 3, the central portion 111 is a region that is overlapped with the lower electrode 3 and the pixel electrode 2 similarly to the overlapped portion 113.

Here, as illustrated in FIG. 3, a region combining the central portion 111 and the overlapped portion 113 is called a first region 115. The non-overlapped portion 114 is also called a second region 114. The overlap relationship between the first region 115 and the second region 114, and the lower electrode 3 and the pixel electrode 2 can also be represented as follows. The first region 115 is a region that is opposed to (faces) the lower electrode 3 and the pixel electrode 2.

The second region 114 is a region that is opposed to the lower electrode 3 but is not opposed to the pixel electrode 2. In the non-overlapped portion 114, the vertex angle ($P_1$ and $P_2$) of a triangle in the case that the boundary between the non-overlapped portion 114 and the overlapped portion 113 is regarded as a base (line segment $P_{11}P_{12}$ and line segment $P_{21}P_{22}$) thereof is not formed to be angular due to the limitations of micromachining. The part corresponding to the vertex angle is rounded off.

Figure 6:
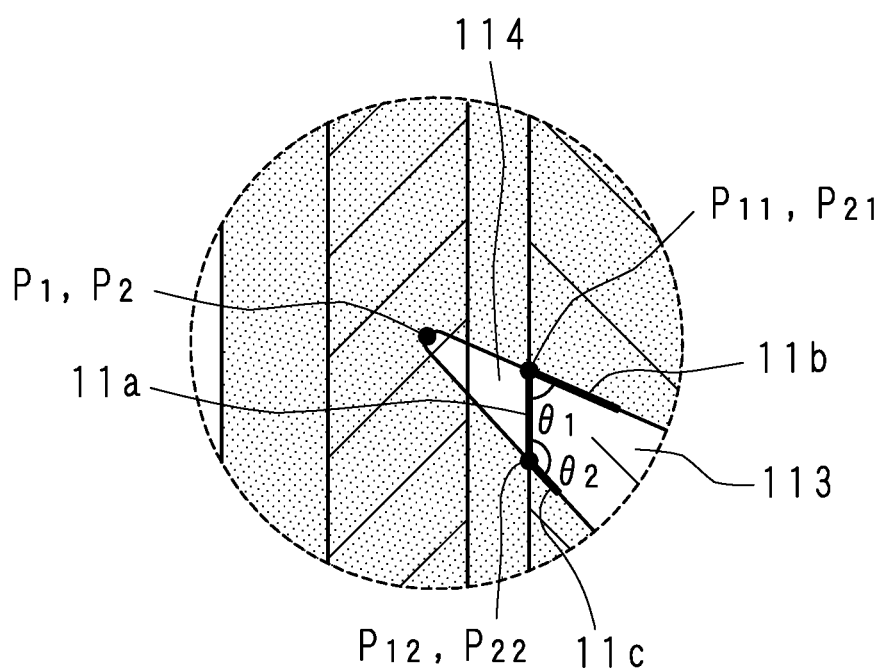
FIG. 6 is an enlarged view of the second region.

FIG. 6 is an enlarged view of the second region 114. FIG. 6 is a region denoted by the reference code 4A in FIG. 1 and FIG. 3 similarly to FIG. 4. The region denoted by the reference code 4B in FIG. 1 and FIG. 3 is also illustrated in the similar manner, and a drawing illustrating the region 4B corresponds to the drawing when FIG. 6 is rotated 180 degrees. As shown in FIG. 1 and FIG. 3, the two second regions 114 are symmetrically disposed with respect to a predetermined point in the central portion 111. In FIG. 6, a boundary (a line segment $P_{11}P_{12}$ and a line segment $P_{21}P_{22}$) between the overlapped portion 113 and the non-overlapped portion 114 is called a first virtual line 11a. A first side 11b is a side forming the overlapped portion 113. The first side 11b is a side that intersects the first virtual line 11a at a point $P_{11}$. In other words, the first side 11b is a side of the overlapped portion 113, having the point $P_{11}$ at one end. The angle (first angle) formed by the first side 11b and the first virtual line 11a is assumed as $\theta_1$. The lower side intersecting the first virtual line 11a, that is, the side of the first region (a line segment including the point $P_{12}$ or a line segment including the point $P_{22}$) proximal to one end of the long side direction of the pixel electrode 2 where the contact hole CH3 is present is a second side 11c. The angle (second angle) formed by the second side 11c and the first virtual line 11a is assumed as $\theta_2$. Here, $\theta_1$ is an acute angle while $\theta_2$ is an obtuse angle.

As can be understood from FIG. 3 together with FIG. 6, the first virtual line 11a can also be said to be a boundary between the first region 115 and the second region 114. Also, the first side 11b is also a side forming the first region 115.

The technical reason for forming the aperture portion 11 in such a shape in the present embodiment will be described with reference to FIGS. 7A-9B.

FIGS. 7A-7B are illustrative view explaining a comparative examples. FIG. 7A is a plane view illustrating a configurational example of one pixel according to the comparative example. In FIGS. 7A-7B also, electrodes or the like are layered in the same order as FIG. 2. A transparent substrate (not illustrated) is provided with a plurality of gate lines 500 and a plurality of source lines 400. A region defined by the two adjacent gate lines 500 and the two adjacent source lines 400 is a pixel. Each pixel is formed with a lower common electrode 300, a pixel electrode 200 and an upper common electrode 100. The lower common electrode 300 covers the gate lines 500 and the source lines 400. The pixel electrode 200 is elongated rectangular. The pixel electrode 200 is provided for each pixel. The upper common electrode 100 is provided with a rectangular aperture portion 101. The upper common electrode 100 covers the pixel electrode 200 other than the aperture portion 101.

FIG. 7B is a plane view illustrating a region enclosed by the dot-and-dash lines in FIG. 7A. Solid two-directional arrows illustrated in FIG. 7B indicate directions of fringe electric fields as seen in plane view. A dot-dot-dash lined two-directional arrow illustrated in FIG. 7B indicates a wiring direction of the source line 400. An outline two-directional arrow indicates a rubbing direction. The angle formed by the wiring direction of the source line 400 and the rubbing direction is $\theta$.

The significance of providing the angle $\theta$ is described here. A potential difference is applied between the pixel electrode 200 and the upper common electrode 100 and between the pixel electrode 200 and the lower common electrode 300. Then, fringe electric fields occur in the directions depicted in the two-directional arrows illustrated in FIG. 7B. In FIG. 7B, the two-directional arrows f11 to f14 across the peripheral edge of the aperture portion 101 indicate the directions of the fringe electric fields when viewed from the plane. Each of the directions of the fringe electric fields is the vertical direction to the peripheral edge of the aperture portion 101 in the drawing.

Here, the direction of the rotation of a liquid crystal molecule is defined by the relationship between the initial alignment direction of the liquid crystal molecule and the direction of the electric field. In other words, the generated fringe electric field makes a liquid crystal molecule change its orientation to be close to the orientation of the electric field by rotation in an acute angle in accordance with the relationship between the electric field and the initial alignment direction (rubbing direction of the liquid crystal molecule). In FIG. 7B, the liquid crystal molecules rotate clockwise at most of the positions. The direction of rotation of the liquid crystal molecules at the most of the positions is assumed as a normal rotation direction. Rotation of the liquid crystal molecules in the normal direction is called a normal rotation. Rotation of the liquid crystal molecules in a direction reverse to the normal rotation is called a reverse rotation.

In FIG. 7B, the angle $\theta$ formed by the wiring direction of the source line 400 and the rubbing direction is greater than 0 degrees. Thus, the fringe electric fields depicted by the two-directional arrows f11 and f12 work so as to make the liquid crystal molecules rotate in the normal direction. In the case that the angle $\theta$ is 0 degrees, that is, the wiring direction of the source line 42 and the rubbing direction are parallel to each other, there is a possibility that the fringe electric fields work so as to make the liquid crystal molecules rotate in the reverse direction. In FIG. 7B, in the case that the angle $\theta$ is 0 degrees, if the liquid crystal molecules rotates so as to get close to the orientation of the fringe electric field occurring in the horizontal direction depicted in the two-directional arrows f11, the angle of rotation is approximately 90 degrees even in the normal rotation and in the reverse rotation. This may cause a reverse rotation. In contrast, in the case that the angle $\theta$ is greater than 0 degrees, the angle of rotation of the liquid crystal molecules is smaller in the normal rotation, which eliminates the occurrence of the reverse rotation.

However, in FIG. 7B, the direction of the fringe electric fields depicted by the arrows f14 is a direction reverse to the rubbing direction with reference to the wiring direction of the source line 400. In example in FIG. 7B, the direction of the fringe electric field depicted by the arrow f14 is a counterclockwise direction with reference to the wiring direction of the source line 400. Therefore, the liquid crystal molecules upon which the fringe electric fields (see arrow f14) act may rotate in the reverse direction. That is, the area depicted by the arrow f14 and its surrounding may be a reverse rotation domain where the liquid crystal molecules rotate in the reverse direction. However, the region where this fringe electric fields occur is one point and has a narrow area because of its configuration of the right angle.

Figure 8A:
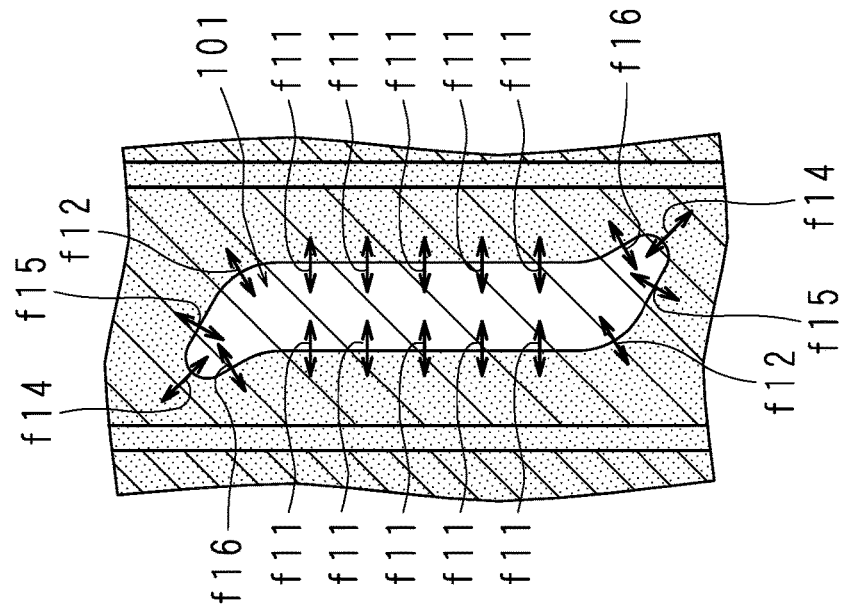
FIG. 8A illustrates a configuration in which the occurrence of the reverse rotation domain can be reduced in a comparative example.
Figure 8B:
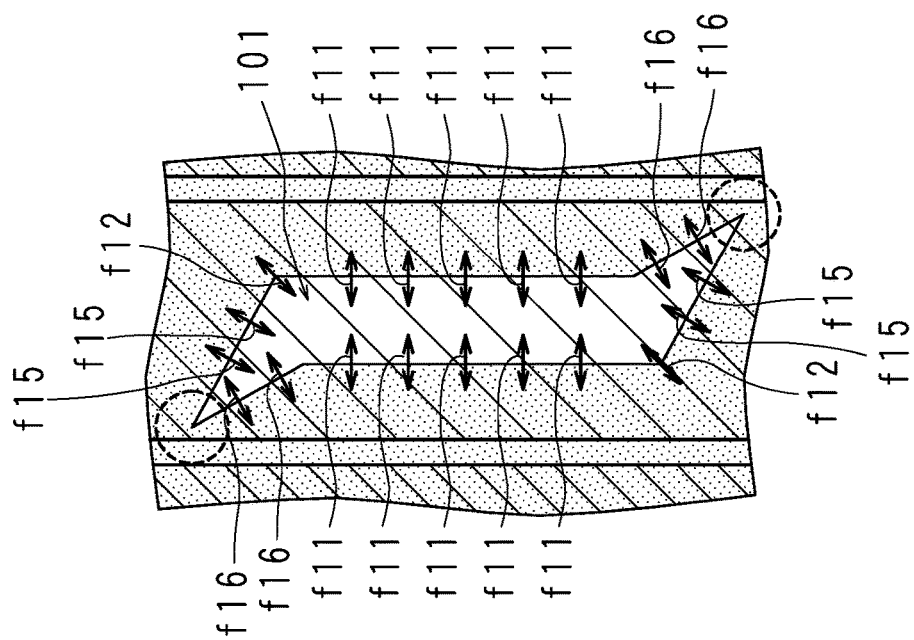
FIG. 8B illustrates a configuration in which the occurrence of the reverse rotation domain can be reduced in a comparative example.

However, as explained in FIGS. 8A-8B, when the corner portion is rounded off, the reverse rotation domain is expanded. Thereupon, by changing the shape of the aperture portion 101, the occurrence of the reverse rotation domain is reduced.

FIGS. 8A-8B illustrate a configuration in which the occurrence of the reverse rotation domain can be reduced in comparative examples. FIG. 9A is a partially enlarged view of FIG. 8A. FIG. 9B is a partially enlarged view of FIG. 8B. As illustrated in FIG. 8A, the end portions of the aperture portion 101 are bent outward. By bending the ends, the corner portions of the aperture portion 101 are formed to have acute angles. The corner portions in FIG. 8A are the parts enclosed by the dotted lines.

However, the reverse rotation domain may be expanded due to the accuracy of finishing for forming a slit. The following description provides the reason. Forming a slit on an electrode is performed by micromachining. Then, the slit is formed (patterned) by a photo-lithography method using a resist. Thus, finer working than the wavelength of the exposure light emitted in an exposure process is difficult. Therefore, even if an end portion of the slit is designed to be formed in an acute angle, the end portion of the slit is actually finished to be rounded off. That is, even if the corner portion is designed to be formed in an acute angle as illustrated in FIG. 8A and FIG. 9A, the tips of the corner portions are rounded off as illustrated in FIG. 8B and FIG. 9B.

It is noted that the rounded shape of the tip of the corner portion also occurs when the corner portion is designed to be formed in a right angle.

When the corner portion is rounded off, the reverse rotation domain is expanded. This will be described in detail. In the case that the corner portion has an acute angle as shown in FIG. 9A, the fringe electric fields of the directions that cause a reverse rotation of the liquid crystal molecules occur only at the region denoted by X. The directions of the fringe electric fields occurring at the rest of the parts are as depicted by f11 to f16. The fringe electric fields of these orientations make the liquid crystal molecules rotate in the normal direction. The region denoted by X is a very narrow region. The fringe electric fields occurring at the adjacent region thereof is directions that make the liquid crystal molecules rotate in the normal direction. Liquid crystal molecules tend to rotate in the same direction as the adjacent molecules when rotating. Thus, the reverse rotation of the liquid crystal molecules less frequently occurs in the region denoted by X in FIG. 9A than in the region in the case where the end portion of the slit is rounded off as illustrated in FIG. 9B.

Meanwhile, in the case that the corner is rounded off as shown in FIG. 9B, the fringe electric fields of directions that cause a reverse rotation of the liquid crystal molecules correspond to the region indicated by a dotted line. That is, the fringe electric fields generated in the other regions are as illustrated by two-directional arrows f11, f21-f27, f31-f34. The fringe electric fields of these directions make the liquid crystal molecules rotate in the normal direction. However, the rounded corner as illustrated in FIG. 9B generates a wider region where the fringe electric fields of directions that cause a reverse rotation of the liquid crystal molecules occur in comparison with the corner with the ideal shape as illustrated in FIG. 9A. That is, the reverse rotation domain is expanded. Thus, there is a high probability of the reverse rotation domain occurring at the region indicated by a dotted line.

As described above, even if the end portion of the slit is designed to be formed in an acute angle, the end portion of the slit is actually finished to be rounded off. Consequently, the reverse rotation domain is highly likely to occur in the rounded part, resulting in degradation in image quality. Thereupon, in the present embodiment, the rounded corner, which is a cause of the reverse rotation domain, is spaced a predetermined distance from the end of the pixel electrode. The predetermined distance is a distance that does not cause the rotation of liquid crystal molecules in the end portion. More specifically, the distance is a first distance or a second distance. The first distance is a distance that does not generate fringe electric fields between the end portion and the pixel electrode. The second distance is a distance that, even if fringe electric fields occur, avoids the reverse rotation of the liquid crystal molecules at the end portion by the fringe electric fields.

More specifically, the second region 114 that is not overlapped with the pixel electrode 2 is provided to the aperture portion 11.

That is, the second region 114 is provided such that in the plane view illustrated in FIG. 1, FIG. 3, FIG. 4, FIG. 6, the corner portion of the diagram where the aperture portion 11 and the pixel electrode 2 are overlapped is equal to or smaller than 90 degrees (see $\theta_1$ in FIG. 6).

The first side 11b of the aperture portion 11 illustrated in FIG. 6 is a straight line. Also, the side portion of the pixel electrode 2 (see FIG. 1, FIG. 3, FIG. 5) is a straight line. The straight part of the aperture portion 11 has higher accuracy of finishing than the end portion of the slit, and therefore, the straight line with high accuracy can be formed.

The corner portion (see $\theta_1$ in FIG. 6) of the region where the aperture portion 11 and the pixel electrode 2 are overlapped as seen from the plane is formed by the first side 11b of the straight line with high accuracy and the side of the pixel electrode 2. Such a corner portion is formed by the straight lines, and this can reduce the possibility of the corner portion being rounded off. Thus, it is possible to reduce the occurrence of the reverse rotation domain.

Especially, as shown in FIG. 3, the overlapped portions 113 are provided at the upper left and the lower right of the aperture portion 11, and thus, it is possible to reduce the occurrence of the reverse rotation domain of the aperture portion 11 as a whole.

Figure 10:
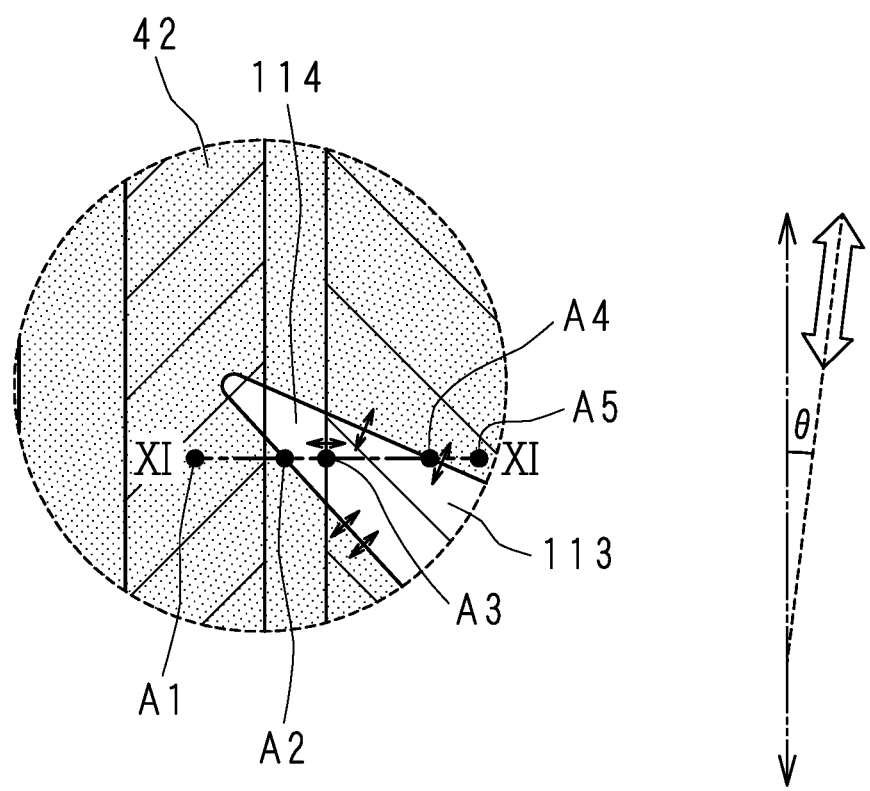
FIG. 10 illustrates directions of the fringe electric fields.
Figure 11:
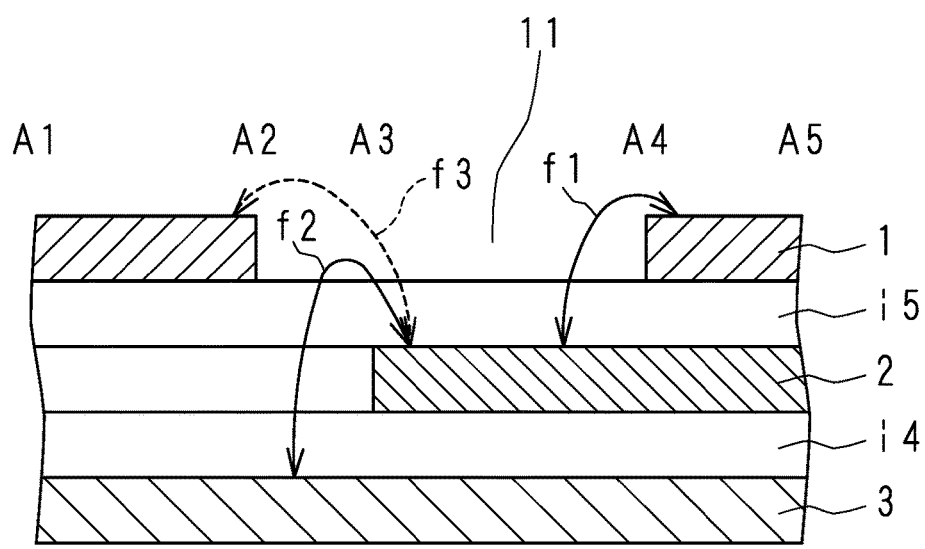
FIG. 11 is a cross-sectional view taken along the line XI-XI of FIG. 10.

FIG. 10 illustrates directions of the fringe electric fields. FIG. 11 is a cross-sectional view taken along the line XI-XI of FIG. 10. It is noted that reference codes A1 to A5 in FIG. 10 and FIG. 11 indicate positions on the section line depicted by dot-and-dash lines.

The cross-sectional structure in FIG. 11 corresponds to that in FIG. 5. The two-directional arrows illustrated in FIG. 11 indicate a fringe electric field occurring between the pixel electrode 2 and the upper electrode 1 and a fringe electric field occurring between the pixel electrode 2 and the lower electrode 3.

The dotted arrow f3 illustrated in FIG. 11 indicates a weaker electric field than the solid arrows f1 and f2. As illustrated in FIG. 11, a fringe electric field (f1) occurs between a first part of the upper electrode 1 and the pixel electrode 2. Here, the first part of the upper electrode 1 is a part denoted by the reference code A4 that is overlapped with the pixel electrode 2, for example. As illustrated in FIG. 10, the direction of the electric field is an orientation that makes the liquid crystal molecules rotate in the normal direction.

Also, a fringe electric field (f2) occurs between the first part of the pixel electrode 2 and the lower electrode 3. Here, the first part of the pixel electrode 2 is a part of the pixel electrode 2 and its surrounding denoted by the reference code A3 that is not overlapped with the upper electrode 1, for example. The fringe electric field is a fringe electric field that occurs between the pixel electrode 2 and the lower electrode 3. In FIG. 10, the fringe electric field (f2) is depicted by an arrow horizontal to the drawing at the end of the pixel electrode 2. The horizontal direction is a direction vertical to the dot-dot-dash arrow indicating the vertical direction in FIG. 10.

In the present embodiment, even the fringe electric field (f2) in such a direction makes the liquid crystal molecules rotate in the normal direction, which enhances transmittance.

In addition, an electric field (f3) occurs between the second part of the upper electrode 1 and the pixel electrode 2. Here, the second part of the upper electrode 1 is a part of thereof denoted by the reference code A2 that is not overlapped with the pixel electrode 2, for example. The second part is spaced from the pixel electrode 2. Thus, even if an electric field occurs, the generated electric field (f3) is weak. Therefore, the electric field (f3) rarely rotates the liquid crystal molecules.

The configuration of the pixel as described above is applied to all the pixels of the liquid crystal display apparatus 1000. As described above, the liquid crystal display apparatus 1000 is provided with a first planar electrode. The first planar electrode is the lower electrode 3, for example. A first insulator is layered over the upper surface of the lower electrode 3. The first insulator is the insulating layer i4, for example. The pixel electrode 2 is layered over the planar upper surface of the insulating layer i4.

A second insulator is further layered over the upper surface of the pixel electrode 2. The second insulator 2 is the insulating layer i5. The liquid crystal display apparatus 1000 is provided with a second planar electrode which covers pixel electrode 2 over the upper surface of the insulating layer i5. The second planar electrode is the upper electrode 1, for example. Furthermore, the liquid crystal display apparatus 1000 has the liquid crystal layer 8 disposed over the upper surface of the upper electrode 1. The upper electrode 1 includes the aperture portion 11 including the first region 115 and the second region 114 integrated with the first region 115. The first region 115 is a region that is overlapped with the lower electrode 3 and the pixel electrode 2. The second region 114 is a region that is overlapped with the lower electrode 3 but is not overlapped with the pixel electrode 2. The first angle formed by the first side 11b of the first region 115 and the first virtual line 11a dividing the aperture portion 11 into the first region 115 and the second region 114 is $\theta_1$. The angle $\theta_1$ is equal to or smaller than 90 degrees. It is noted that the second region 114 is tapered toward the tip, extending toward the short side direction of the pixel electrode 2 from the first region 115.

According to the present embodiment, the corner portion (see $\theta_1$ in FIG. 6) of the region where the aperture portion 11 and the pixel electrode 2 are overlapped as seen from the plane is formed by the first side 11b of the straight line with high accuracy and the side of the pixel electrode 2. Thus, it is possible to reduce the occurrence of the reverse rotation domain. In other words, the corner portion of the second region 114 is formed in an acute angle to thereby reduce the occurrence of fringe electric fields that contribute to the occurrence of the reverse rotation domain.

(Embodiment 2)

Figure 12:
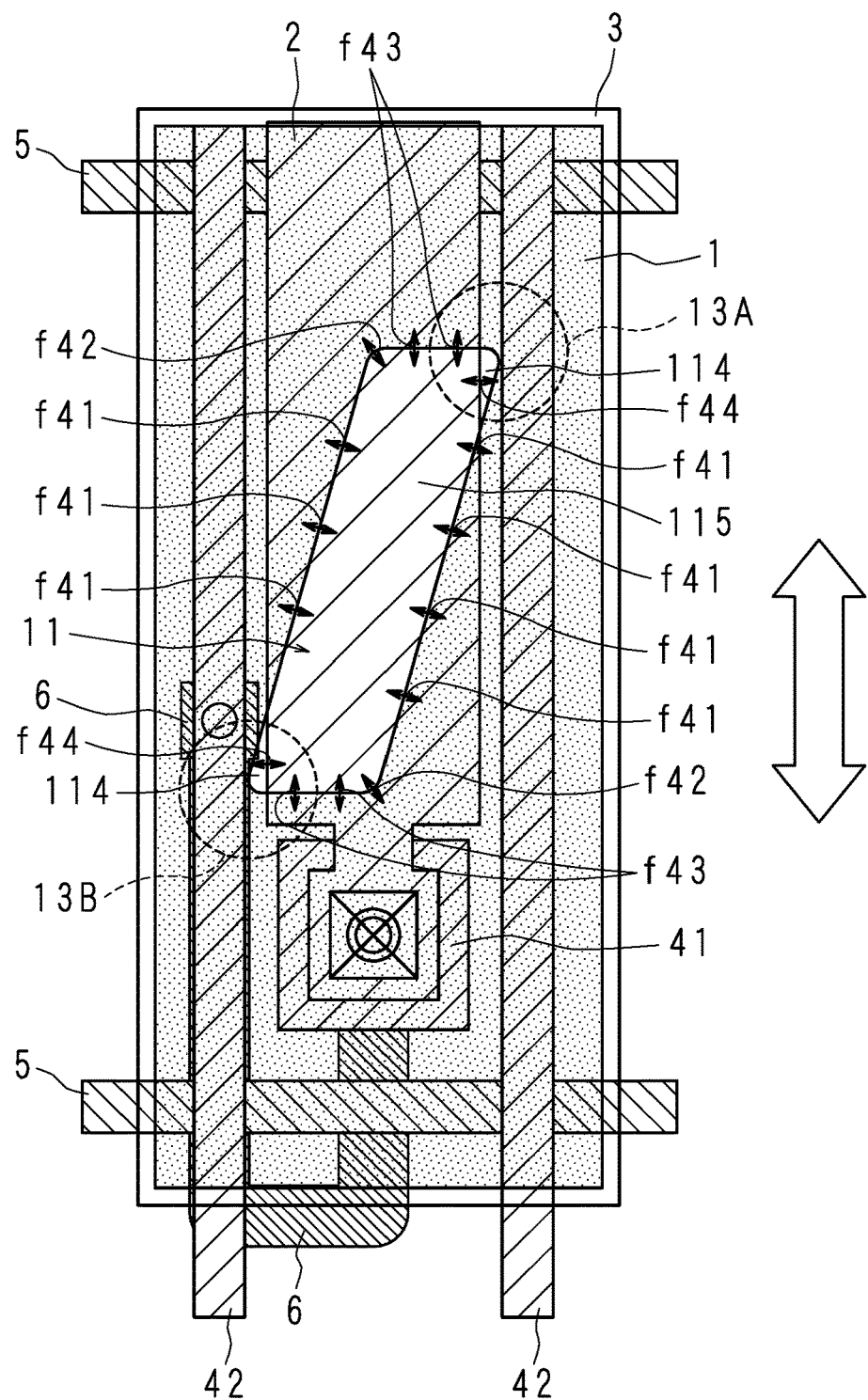
FIG. 12 is a plane view illustrating another configurational example of one pixel of the liquid crystal display apparatus.

FIG. 12 is a plane view illustrating another configurational example of one pixel of the liquid crystal display apparatus 1000. The present embodiment is similar to Embodiment 1 other than the shape of the aperture portion 11 provided to the upper electrode 1, and thus, the following description mainly provides differences from Embodiment 1.

The aperture portion 11 provided to the upper electrode 1 is parallelogram-shaped. The short side of the aperture portion 11 is parallel to the short side direction of the pixel electrode 2. The two corner portions including acute angles of the aperture portion 11 is not overlapped with the pixel electrode 2. The corner portions are the second regions 114. The region other than the corner portions is the first region 115. It is noted that "the two corner portions including the acute angles" of the aperture portion 11 is described, but strictly speaking, the corner portions are rounded off due to the limitations of micromachining as described above.

Figure 13:
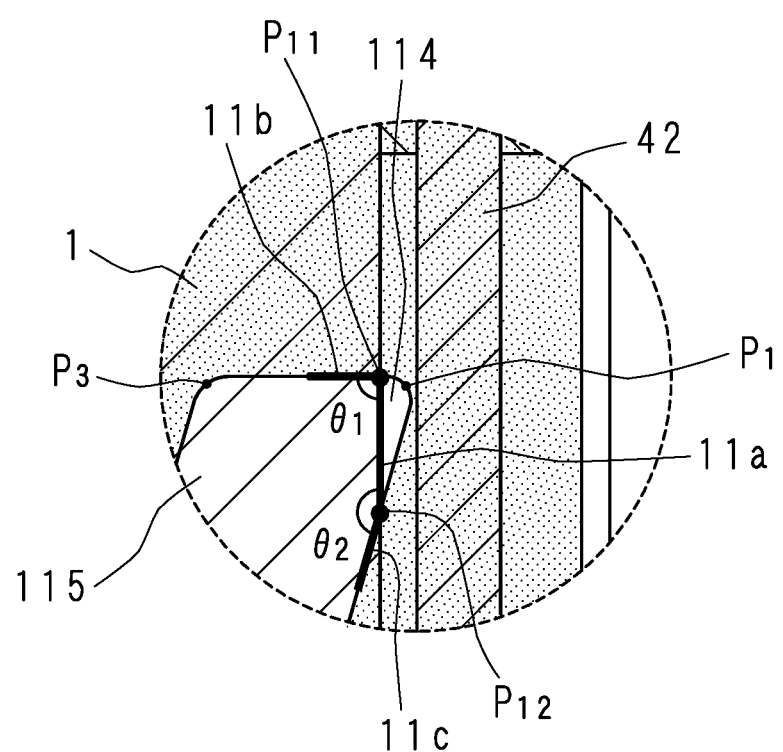
FIG. 13 is a partially enlarged view of the second region.

FIG. 13 is a partially enlarged view of the second region 114. FIG. 13 illustrates a region denoted by the reference code 13A in FIG. 12. The region denoted by the reference code 13B in FIG. 12 is illustrated in the similar manner, and the drawing representing the region denoted by 13B corresponds to the drawing when FIG. 13 is rotated 180 degrees. The two second regions 114 are point-symmetrically disposed with respect to the barycenter of the parallelogram. In FIG. 13, the boundary (line segment $P_{11}P_{12}$) between the first region 115 and the second region 114 is the first virtual line 11a. The upper side intersecting the first virtual line 11a, that is, the side (line segment $P_{11}P_3$) of the first region 115 proximal to one end of the long side direction of the pixel electrode 2 where the contact hole CH3 is absent is the first side 11b. The angle formed by the first side 11b and the first virtual line 11a is assumed as $\theta_1$. The lower side intersecting the first virtual line 11a, that is, the side (line segment having point $P_{12}$ at one end thereof) of the first region 115 that is parallel to the long side direction of the pixel electrode 2 is the second side 11c. The angle formed by the second side 11c and the first virtual line 11a is assumed as $\theta_2$. Here, $\theta_1$ is a right angle (90 degrees) while $\theta_2$ is an obtuse angle.

Referring to FIG. 12, the following description provides the fringe electric fields according to the present embodiment. The fringe electric fields occurring at the long side of the aperture portion 11 correspond to directions depicted by the two-directional arrows f41 as seen from the plane. An outline two-directional arrow in FIG. 12 indicates a rubbing direction. Accordingly, by the fringe electric fields depicted by the two-directional arrows f41, the counterclockwise direction is the normal rotational direction of the liquid crystal molecules when seen from the plane. Also, the fringe electric fields occurring at the upper-left corner portion and the lower-right corner portion of the aperture portion 11 are directions depicted by the two-directional arrows f42. The fringe electric fields in such directions also make the liquid crystal molecules rotate in the normal direction relative to the rubbing direction. The fringe electric fields occurring at the short side of the aperture portion 11 corresponding to the first side 11b illustrated in FIG. 13 are directions depicted by the two-directional arrows f43. The fringe electric fields occurring at the first virtual line 11a illustrated in FIG. 13 have directions depicted by the two-directional arrows f44 illustrated in FIG. 12.

The fringe electric fields occurring at a right-angled portion including an upper-right corner and a lower-left corner each being formed by a side of the aperture portion 11 and a side of the pixel electrode 2 may make the liquid crystal molecules rotate at the right-angled portion in the reverse direction as illustrated in FIG. 7B (see the arrow f14 in FIG. 7B). However, the right-angled portion is not rounded off unlike the example explained with reference to FIG. 8B, which prevents the reverse rotation domain from occurring. The right-angled portion at the upper-right corner forms the angle denoted by the reference code θ1 in FIG. 13.

Embodiment 2 has the following effects. The upper-right and lower-left corner portions of the aperture portion 11 that is parallelogram-shaped are extended toward the short side direction of the pixel electrode 2. Thus, even if the corner portions are rounded off due to the limitations of micromachining, the angle $\theta_1$ formed by the first side 11b of the first region 115 and the first virtual line 11a dividing the aperture portion 11 into the first region 115 and the second region 114 can be formed into a right angle. Surely, the fringe electric fields occurring at the right-angle portion may contribute to the reverse rotation. However, the right-angle portion is not rounded off unlike the example explained with reference to FIG. 8B, which prevents the reverse rotation domain from occurring. It is thus possible to reduce the occurrence of the reverse rotation domain.

(Embodiment 3)

FIGS. 14A-14B illustrate a state in which the pixel electrode 2 and the aperture portion 11 provided to the upper electrode 1 are overlapped. The present embodiment is similar to Embodiment 1 other than the shape of the aperture portion 11 provided to the upper electrode 1 and the shape of the pixel electrode 2, and thus, the following description mainly provides differences from Embodiment 1.

Embodiment 3 is a configuration in which a pixel and the pixel electrode 2 are tilted. The long side direction of each of the pixel and the pixel electrode 2 is a direction tilted by a predetermined angle from the rubbing direction (vertical direction of the drawing) as depicted by an outline arrow. The aperture portion 11 provided to the upper electrode 1 is parallelogram-shaped. FIGS. 14A-14B illustrate two examples of the aperture portions 11 that are different in shapes and sizes. FIG. 14A illustrates an instance where the second region 114 of the aperture portion 11 that is not overlapped with the pixel electrode 2 is triangular ($P_1$, $P_{11}$, $P_{12}$ or $P_2$, $P_{21}$, $P_{22}$). FIG. 14B illustrates an instance where the pixel electrode 2 and the second region 114 of the aperture portion 11 are quadrangular ($P_1$, $P_{11}$, $P_{12}$, $P_4$ or $P_2$, $P_{21}$, $P_{22}$, $P_3$). It is noted that the corner portions P1 and P2 of the aperture portion 11 are, strictly speaking, rounded off due to the limitations of micromachining.

In the example of FIG. 14A, the short sides (line segment $P_1P_3$ and line segment $P_2P_4$) of the aperture portion 11 are parallel to or tilted more steeply than the short side direction of the pixel electrode 2. The long sides (line segment $P_1P_4$ and line segment $P_2P_3$) of the aperture portion 11 are less steep than the long side direction of the pixel electrode 2. Each of the short sides of the aperture portion 11 intersects the long side of the pixel electrode 2 at one position. The intersection points are denoted by $P_{11}$ and $P_{21}$. Each of the long sides of the aperture portion 11 intersects the long side of the pixel electrode 2 at one position. The intersection points are denoted by be $P_{12}$ and $P_{22}$. By such an intersection relationship, the aperture portion 11 is formed with the first region 115 that is overlapped with the pixel electrode 2 and the two second regions 114 that are not overlapped with the pixel electrode 2. The first region 115 is hexagonal ($P_{11}$, $P_{12}$, $P_4$, $P_{21}$, $P_{22}$, $P_3$). The second region 114 is triangular ($P_1$, $P_{11}$, $P_{12}$ and $P_2$, $P_{21}$, $P_{22}$).

A part of the short side (line segment $P_{11}P_3$ and line segment $P_{21}P_4$) of the aperture portion 11 that includes the intersection points $P_{11}$ or $P_{12}$ and is overlapped with the pixel electrode 2 is the first side 11b of the first region 115. A part of the side (line segment $P_{11}P_{12}$ and $P_{21}P_{22}$) of the pixel electrode 2 that intersects the first side 11b is the first virtual line 11a dividing the aperture portion 11 into the first region 115 and the second region 114. A part of the long side (line segment $P_{12}P_4$ and $P_{22}P_3$) of the aperture portion 11 that includes the intersection point $P_{12}$ or $P_{22}$ and is overlapped with the pixel electrode 2 is the second side 11c of the first region 115. The angle formed by the first side 11b and the first virtual line 11a is assumed to be $\theta_1$. The angle formed by the second side 11c and the first virtual line 11a is assumed to be $\theta_2$. Here, $\theta_1$ is an acute angle while $\theta_2$ is an obtuse angle.

In the example illustrated in FIG. 14B, the short side (line segment $P_1P_3$ and line segment $P_2P_4$) of the aperture portion 11 is parallel to or steeper than the short side direction of the pixel electrode 2. The long side (line segment $P_1P_4$ and line segment $P_2P_3$) of the aperture portion 11 is parallel to or steeper than the long side direction of the pixel electrode 2. The short side of the aperture portion 11 is sufficiently longer than the short side of the pixel electrode 2. Thus, each of the short sides of the aperture portion 11 intersects the long side of the pixel electrode 2 at two points. The intersection points are assumed as intersections $P_{11}$ and $P_{22}$ as well as intersections $P_{12}$ and $P_{21}$. In addition, each of the long sides of the aperture portion 11 does not intersect the long side of the pixel electrode 2. By such an intersection relationship, the aperture portion 11 is formed with the first region 115 that is overlapped with the pixel electrode 2 and the two second regions 114 that are not overlapped with the pixel electrode 2. The first region 115 is quadrangular ($P_{11}$, $P_{12}$, $P_{21}$, $P_{22}$). The second regions 114 are quadrangular ($P_1$, $P_{11}$, $P_{12}$, $P_4$ and $P_2$, $P_{21}$, $P_{22}$, $P_3$). The two second regions 114 are point-symmetrically disposed with respect to the barycenter of the parallelogram.

A part of the short side (line segment $P_{11}P_{12}$ and line segment $P_{21}P_{22}$) of the aperture portion 11 that includes the intersection points $P_{11}$ or $P_{21}$ and is overlapped with the pixel electrode 2 is the first side 11b of the first region 115. The long side (line segment $P_{11}P_{12}$ and $P_{21}P_{22}$) of the pixel electrode 2 that intersects the first side 11b is the first virtual line 11a dividing the aperture portion into the first region 115 and the second region 114. Assuming that the angle formed by the first side 11b and the first virtual line 11a is $\theta_1$, $\theta_1$ is an acute angle. It is noted that in the example illustrated in FIG. 14B, there is no second side 11c.

In the present embodiment, the fringe electric fields occur in the directions illustrated in FIGS. 14A-14B. As illustrated in FIG. 14A and FIG. 14B, the fringe electric fields make the liquid crystal molecules rotate in the counterclockwise direction (normal rotation) at the most part thereof. The fringe electric fields occurring at the first side 11b are parallel to the rubbing direction, and thus do not contribute to the normal rotation or the reverse rotation of the liquid crystal molecules. Meanwhile, the fringe electric fields occurring at the upper-right corner $P_{11}$ and the lower-left corner $P_{21}$ of the first region 115 can contribute to the reverse rotation of the liquid crystal molecules. However, since the upper-right corner $P_{11}$ and the lower-left corner $P_{21}$ are formed in an acute angle, fringe electric fields that contribute to the reverse rotation of the liquid crystal molecules occur only at the vertex portions of the corners. Such fringe electric fields have less contribution to the rotation of the liquid crystal molecules. Accordingly, the reverse rotation of the liquid crystal molecules are reduced at the vertex portions.

Embodiment 3 has the following effects. The aperture portion 11 provided to the upper electrode 1 has the first region 115 that is overlapped with the pixel electrode 2 and the second region 114 that is not overlapped with the pixel electrode 2. The second region 114 extends from the first region 115 in the short side direction of the pixel electrode 2. Thus, even if the corner portions P1, P2 of the second region 114 are rounded off due to the limitations of the micromachining, the angle ($\theta_1$) formed by the first side 11b of the first region 115 and the first virtual line 11a dividing the aperture portion 11 into the first region 115 and the second region 114 can be formed in an acute angle. The fringe electric fields occurring at the corners can contribute to the reverse rotation of the liquid crystal molecules, but only at the vertex portions of the corners. Accordingly, it is possible to avoid the occurrence of the reverse rotation domain at the vertex portions.

(Embodiment 4)

Figure 15:
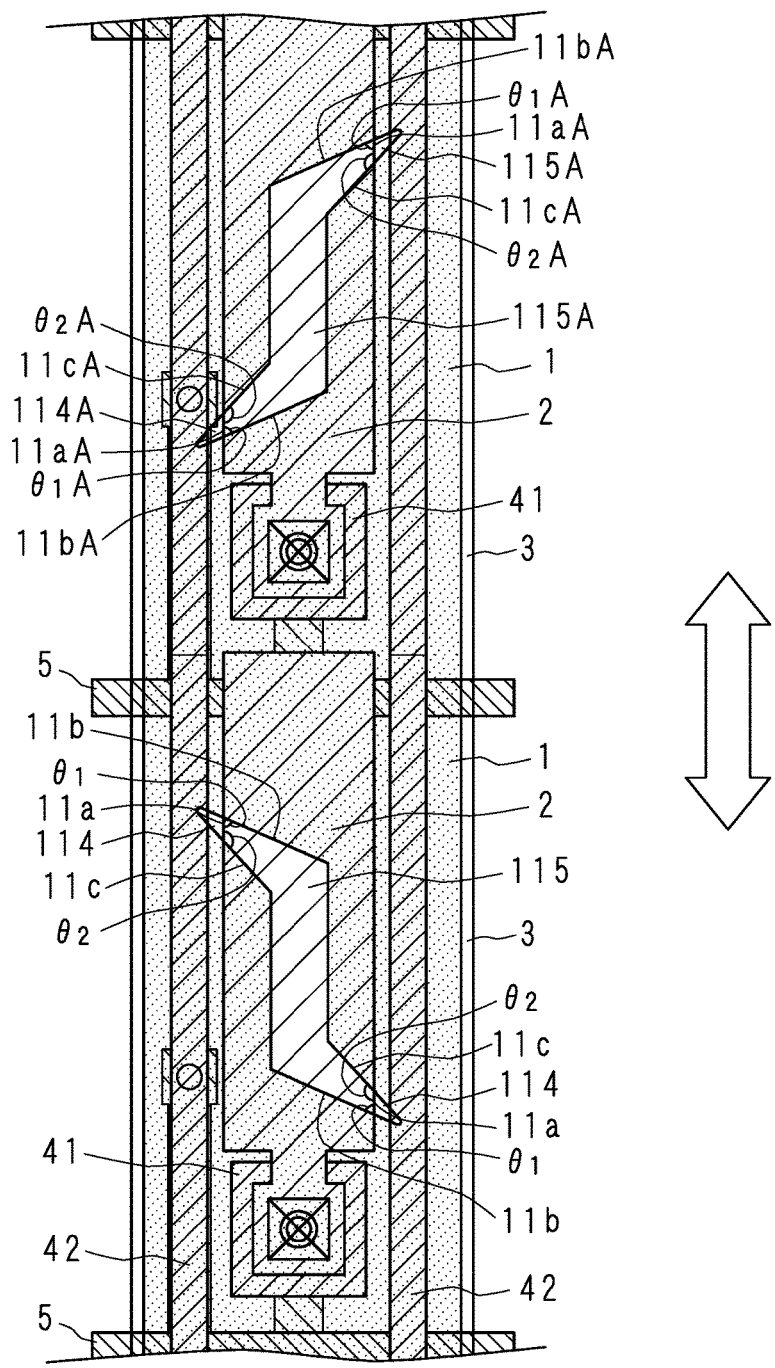
FIG. 15 is a plane view illustrating a configurational example of two adjacent pixels along the wiring direction of the source line in the liquid crystal display apparatus.

FIG. 15 is a plane view illustrating a configurational example of two adjacent pixels along the wiring direction of the source line 42 in the liquid crystal display apparatus 1000. The present embodiment illustrates a liquid crystal display apparatus 1000 with a so-called multi-domain structure. That is, it is configured to include two pixels in which liquid crystal molecules are rotated not in a uniform direction but in opposite directions. The two pixels shown in FIG. 15 are configured so as to rotate the liquid crystal molecules in different directions. The outline two-directional arrow illustrated in FIG. 15 indicates the rubbing direction. The configuration of the lower pixel illustrated in FIG. 15 is similar to that of Embodiment 1. In the lower pixel, the rotational direction of the liquid crystal molecules is the clockwise direction as seen from a plane. The configuration of the upper pixel illustrated in FIG. 15 is similar to that Embodiment 1 other than the shape of the aperture portion 11A provided to the upper electrode 1. The shape of the aperture portion 11A and the shape of the aperture portion 11 are line-symmetrically disposed with respect to a line parallel to the wiring direction of the gate line 5. Alternatively, two aperture portions adjacent to each other in the direction along the gate line 5 (in the lateral direction of the drawing) may be line-symmetrically disposed with respect to a line parallel to the wiring direction of the source line 42. In the upper pixel illustrated in FIG. 15, the rotational direction of the liquid crystal molecules is the counterclockwise direction as seen from a plane. The upper pixel and the lower pixel are separate domains that are different in rotational directions of liquid crystal molecules. In the multi-domain structure, since pixels that are adjacent to each other along the wiring direction of the gate line 5 and the source line 42 are different in rotational directions of the liquid crystal molecules, the aperture portions 11 and 11A that are provided to the upper electrode 1 are symmetrically disposed.

The configuration of the lower pixel in FIG. 15 is similar to that of the pixel of Embodiment 1, and thus, will not be described by applying the same reference codes to the parts equivalent to Embodiment 1. In the upper pixel, the aperture portion 11A is symmetrically disposed with the aperture portion 11, and therefore, the configuration equivalent to Embodiment 1 is denoted by the reference code with "A" and described briefly. In the aperture portion 11A, 11aA denotes the first virtual line, 11bA denotes the first side, and 11cA denotes the second side. The angle formed by the first side 11bA and the first virtual line 11aA is $\theta_1$ A. The angle formed by the second side 11cA and the first virtual line 11aA is $\theta_2$ A. The $\theta_1$ A. is an acute angle and the $\theta_2$ A is an obtuse angle. The present embodiment corresponds to Embodiment 1 with a multi-domain structure. Accordingly, the effect of the present embodiment is similar to that of Embodiment 1.

That is, the aperture portions 11 and 11A provided to the upper electrode 1 have the first regions 115, 115A that are overlapped with the pixel electrode 2 and the second regions 114, 114A that are not overlapped with the pixel electrode 2. The second regions 114 and 114A extend to the short side direction of the pixel electrode 2 from the first region 115, 115A. The second regions 114, 114A are tapered toward their tip portions. Therefore, even if the tip portions of the second regions 114, 114A are rounded off due to the limitations of the micromachining, the angles ($\theta_1$ and $\theta_1$A) formed by the first sides 11b, 11bA of the first regions 115, 115A and the first virtual lines 11a, 11aA dividing the aperture portion 11, 11A into the first region 115, 115A and the second regions 114, 114A can be acute angles. That is, the corner portion of the region where the aperture portion 11(11A) and the pixel electrode 2 are overlapped as seen from the plane is formed by the straight first side 11b (11bA) formed with high accuracy and the side of the pixel electrode 2. Thus, it is possible to reduce the occurrence of the reverse rotation domain. In other words, the acute angle of the corner portion of the second region 114 makes it possible to reduce the occurrence of the fringe electric fields that contribute to the occurrence of the reverse rotation domain.

It is noted that, similar to Embodiment 4, the configurations of Embodiment 2 and Embodiment 3 can be applied to the liquid crystal display apparatus 1000 with multi-domain structure.

(Embodiment 5)

Figure 16:
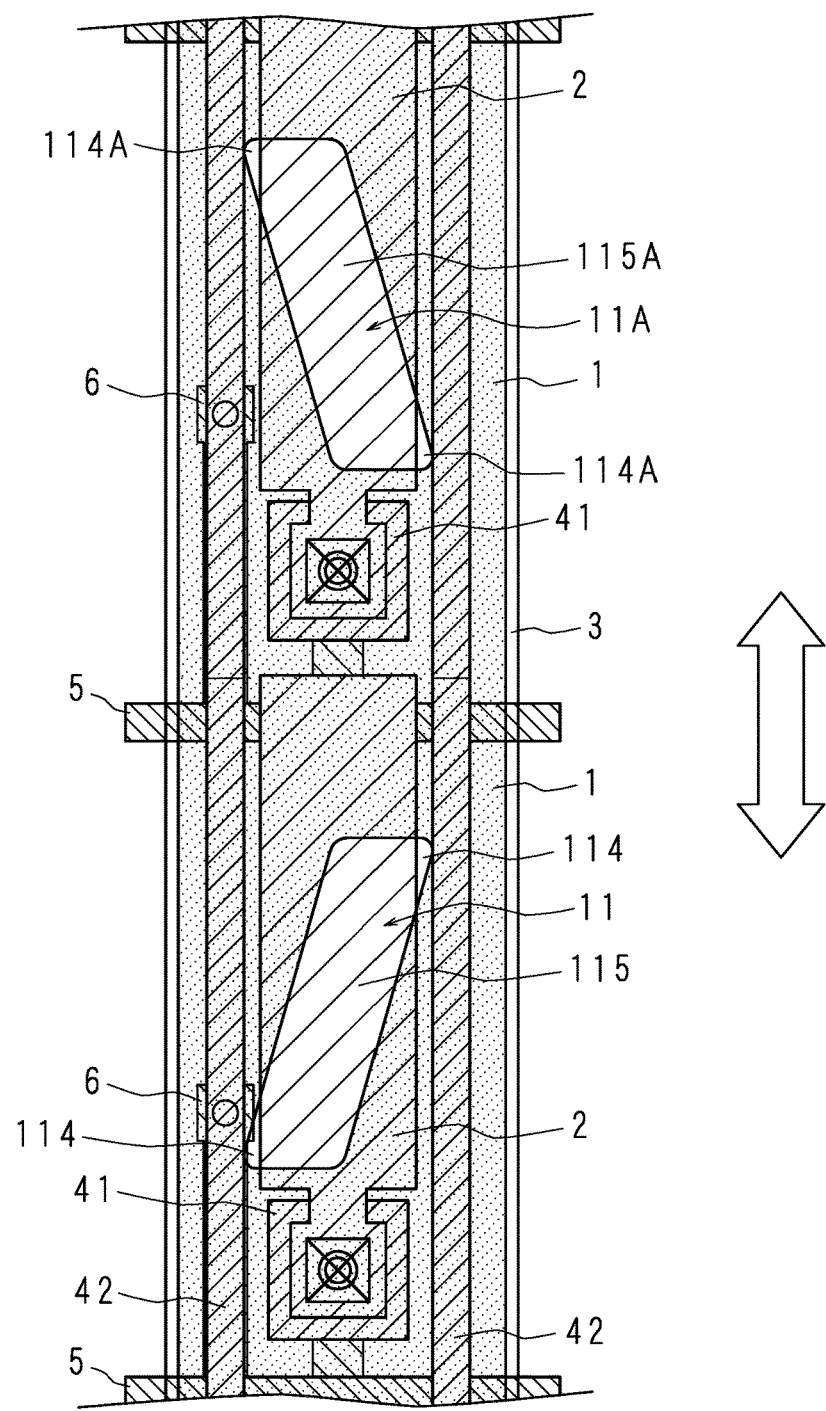
FIG. 16 is a plane view illustrating another example of a configuration of two adjacent pixels to each other along the wiring direction of the source line of the liquid crystal display apparatus.

The present embodiment relates to an instance where the configuration of Embodiment 2 is applied to the liquid crystal display apparatus 1000 with multi-domain structure. FIG. 16 is a plane view illustrating another example of a configuration of two adjacent pixels to each other along the wiring direction of the source line 42 of the liquid crystal display apparatus 1000. The configuration of the lower pixel illustrated in FIG. 16 is similar to that of the pixel in Embodiment 2. The configuration of the upper pixel illustrated in FIG. 16 is similar to that of the lower pixel other than the aperture portion 11A. The aperture portion 11A of the upper pixel and the aperture portion 11 of the lower pixel are symmetrical in shape.

The aperture portion 11A of the upper pixel comprises the first region 115A and the second region 114A. The second region 114A is not overlapped with the pixel electrode 2. The corner portion of the first region 115 or 115A adjacent to the second region 114 or 114A has a right angle. As described in Embodiment 2, the fringe electric fields occurring at the right-angle portion can also contribute to a reverse rotation. However, the right-angle portion is not rounded off unlike the example explained with reference to FIG. 8B, which can reduce the occurrence of the reverse rotation domain.

(Embodiment 6)

Figure 17:
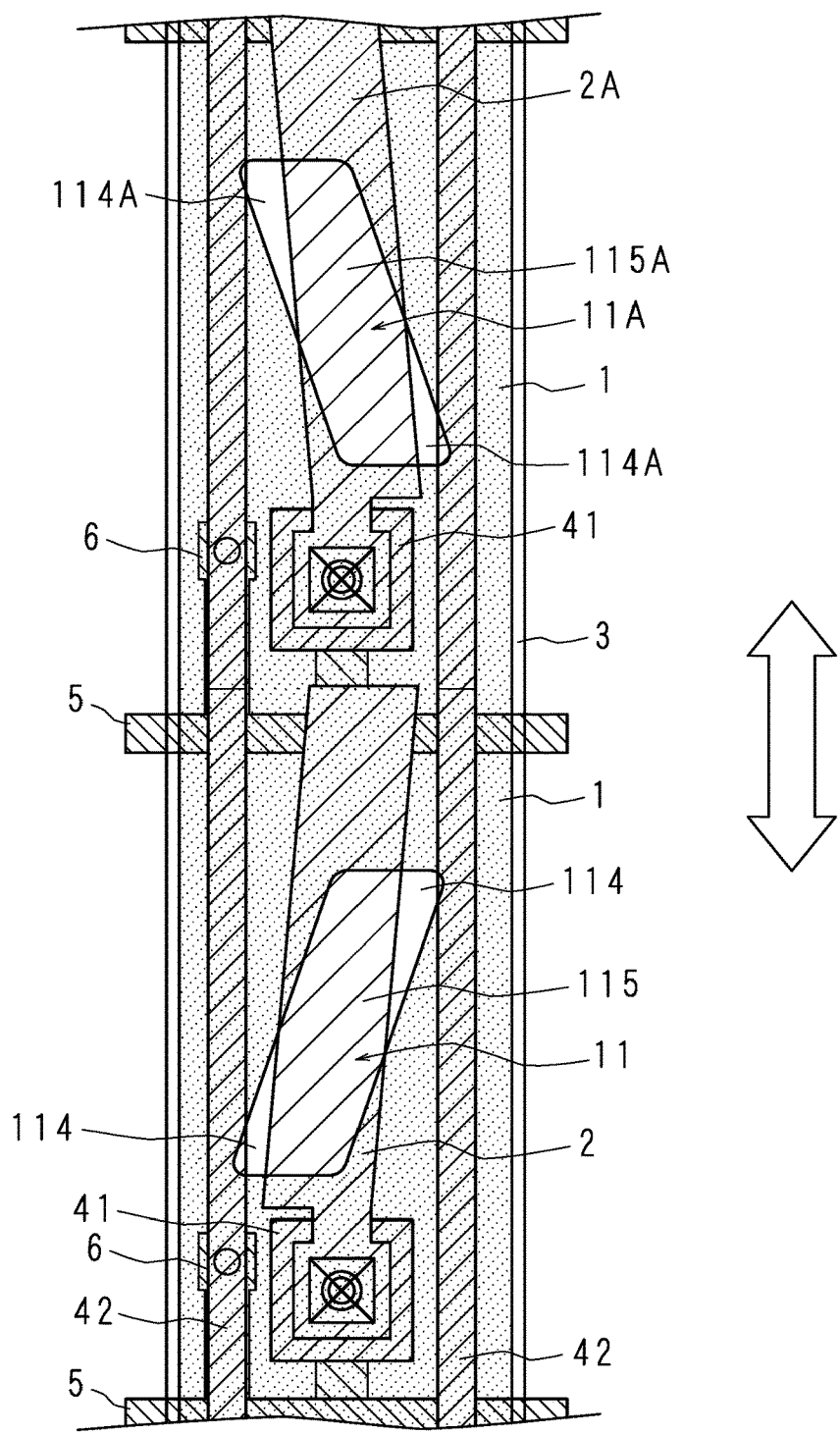
FIG. 17 is a plane view illustrating another example of a configuration of two adjacent pixels to each other along the wiring direction of the source line of the liquid crystal display apparatus.

FIG. 17 is a plane view illustrating another example of a configuration of two adjacent pixels to each other along the wiring direction of the source line of the liquid crystal display apparatus 1000. The present embodiment is similar to Embodiment 5 other than the shape of the pixel electrode 2. In the present embodiment, the long side direction of the pixel electrode 2 is not parallel to but tilted relative to the wiring direction of the source line 42. The present embodiment corresponds to an instance where the example in FIG. 14A of Embodiment 3 is applied to the multi-domain structure.

In the present embodiment also, the aperture portion 11 of the lower pixel comprises the first region 115 and the second region 114. The second region 114 is not overlapped with the pixel electrode 2. The aperture portion 11A of the upper pixel comprises the first region 115A and the second region 114A. The second region 114A is not overlapped with the pixel electrode 2. According to the present embodiment, similarly to Embodiment 3, it is possible to reduce the occurrence of the reverse rotation domain.

(Embodiment 7)

Figure 18:
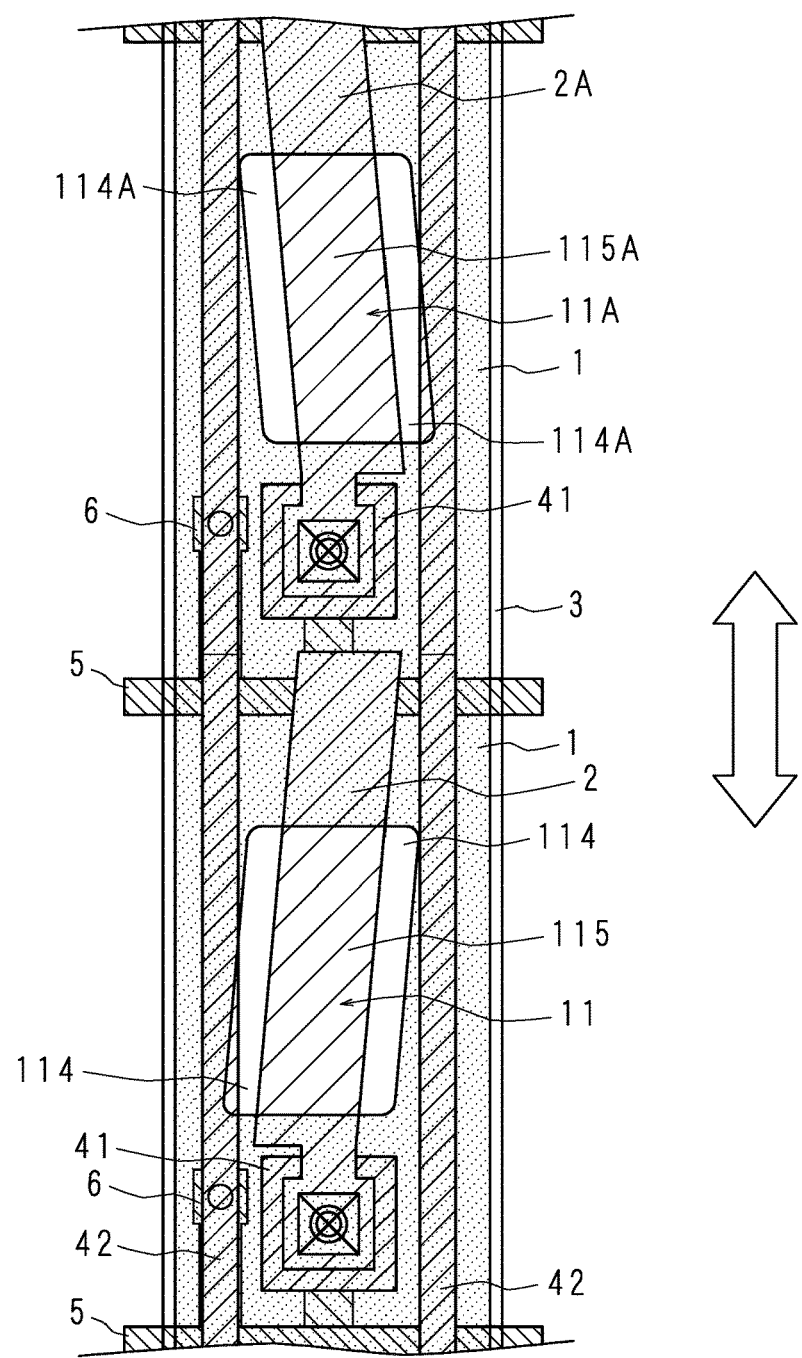
FIG. 18 is a plane view illustrating another example of a configuration of two adjacent pixels to each other along the wiring direction of the source line of the liquid crystal display apparatus.

FIG. 18 is a plane view illustrating another example of a configuration of two adjacent pixels to each other along the wiring direction of the source line of the liquid crystal display apparatus 1000. The present embodiment corresponds to an instance where the example in FIG. 14B of Embodiment 3 is applied to the multi-domain structure.

In the present embodiment also, the aperture portion 11 of the lower pixel comprises the first region 115 and the second region 114. The second region 114 is not overlapped with the pixel electrode 2. The aperture portion 11A of the upper pixel comprises the first region 115A and the second region 114A. The second region 114A is not overlapped with the pixel electrode 2. According to the present embodiment, similarly to Embodiment 3, it is possible to reduce the occurrence of the reverse rotation domain.

(Embodiment 8)

Figure 19:
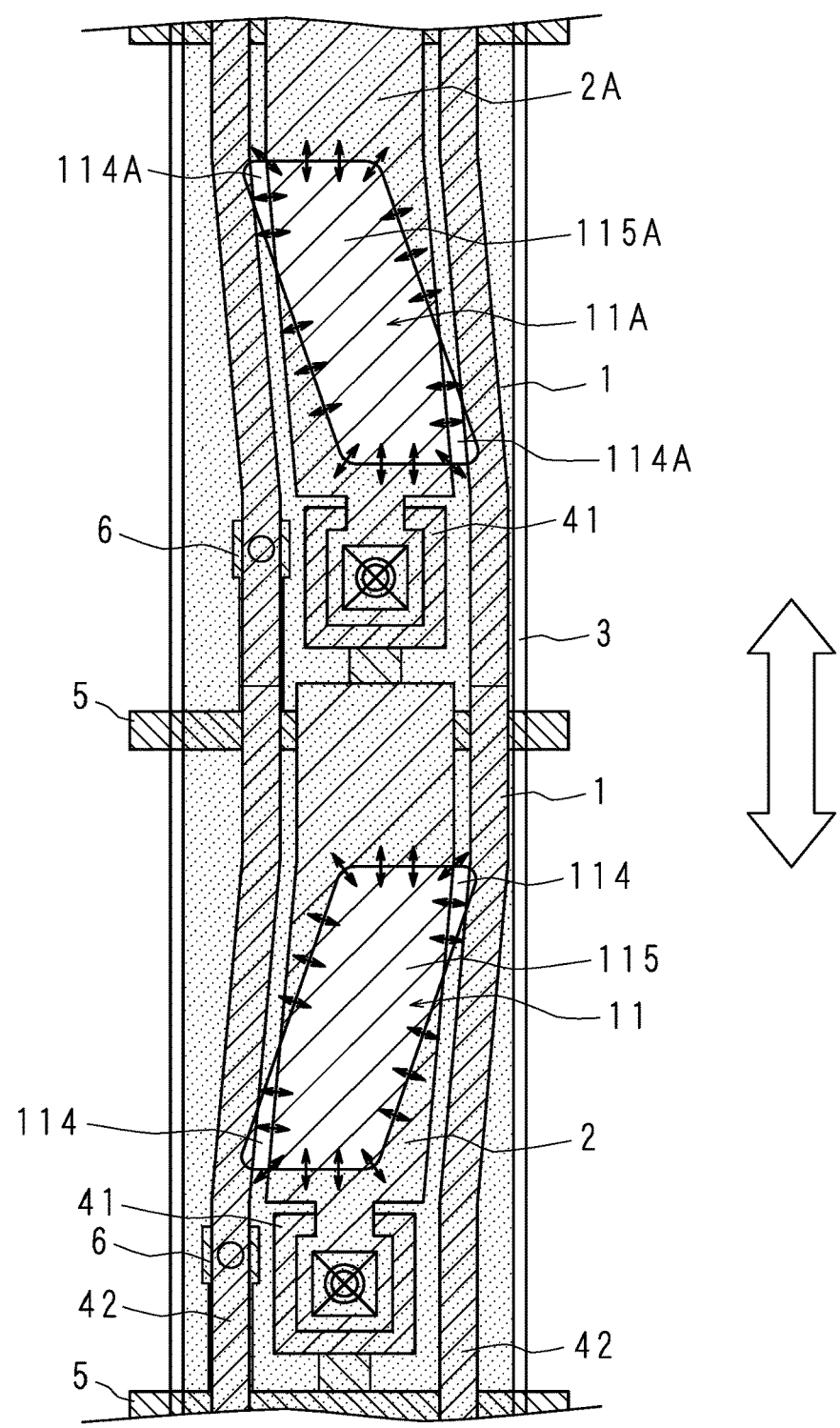
FIG. 19 is a plane view illustrating another example of a configuration of two adjacent pixels to each other along the wiring direction of the source line of the liquid crystal display apparatus.

FIG. 19 is a plane view illustrating another example of a configuration of two adjacent pixels to each other along the wiring direction of the source line of the liquid crystal display apparatus 1000. The configuration of the present embodiment is similar to that of Embodiment 6 other than the shape of the source line 42. In the present embodiment, the source line 42 is not a straight line but a bent line. The source line 42 is aligned so as to be parallel to the long side of the pixel electrode 2.

In the present embodiment also, the aperture portion 11 of the lower pixel comprises the first region 115 and the second region 114. The second region 114 is not overlapped with the pixel electrode 2. The aperture portion 11A of the upper pixel comprises the first region 115A and the second region 114A. The second region 114A is not overlapped with the pixel electrode 2. In the present embodiment also, the fringe electric fields occurring at the peripheral edge of the first region 115, 115A have directions illustrated in FIG. 19 as seen from the plane. Similarly to Embodiment 3 (FIG. 14A), the fringe electric fields occurring at the most part of the lower first region 115 contribute to make the liquid crystal molecules rotate in the normal (counterclockwise) direction. At the upper-right corner and the lower-left corner, which are formed in acute angles, fringe electric fields that contribute to the reverse rotation of the liquid crystal molecules may occur. However, the fringe electric fields only occur at the vertex portions of the corners. Therefore, similarly to Embodiment 2, it is possible to reduce the occurrence of the reverse rotation domain.

(Embodiment 9)

Figure 20:
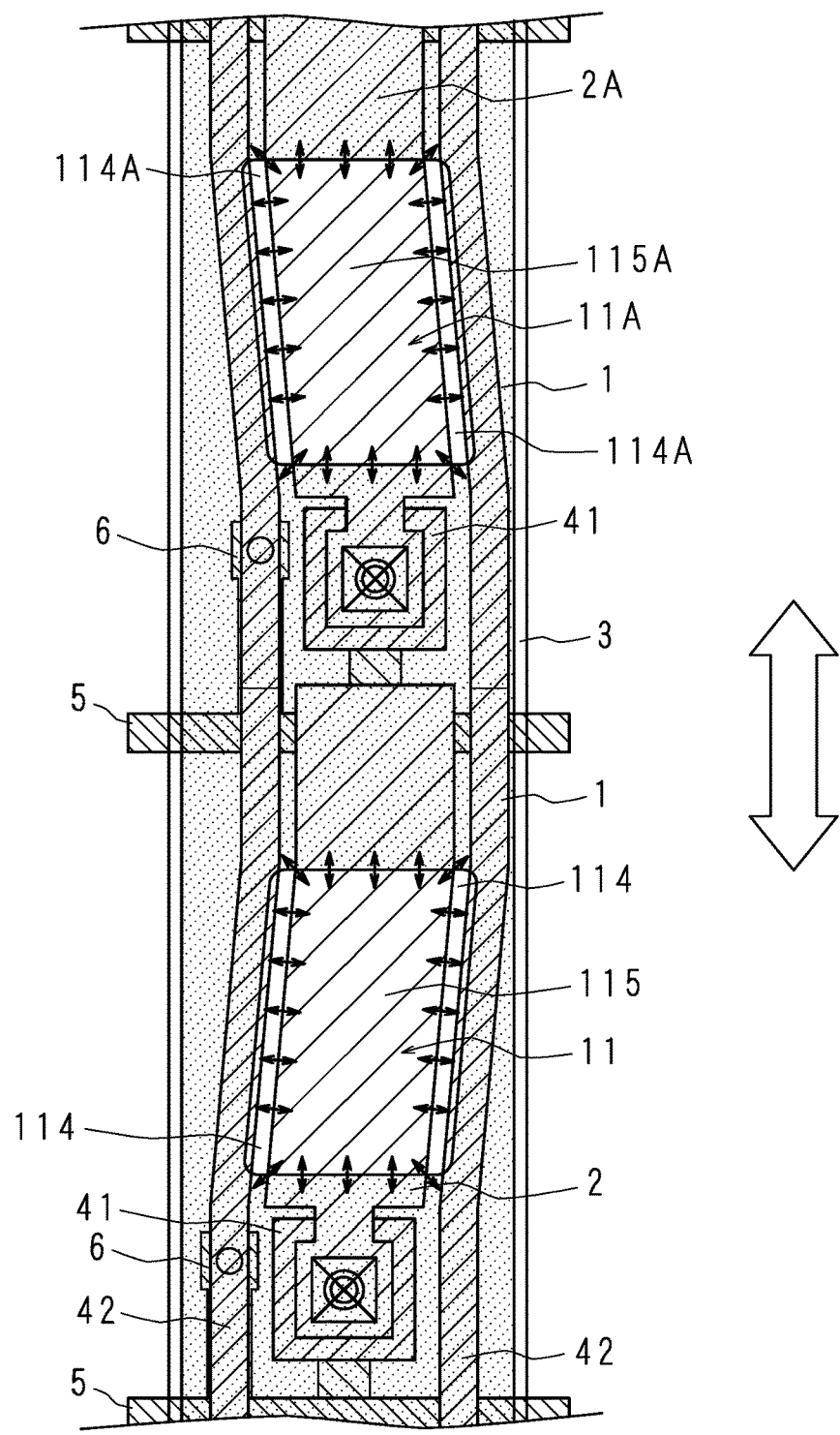
FIG. 20 is a plane view illustrating another example of a configuration of two pixels adjacent along the wiring direction of the source line of the liquid crystal display apparatus.

FIG. 20 is a plane view illustrating another example of a configuration of two pixels adjacent along the wiring direction of the source line of the liquid crystal display apparatus 1000. The present embodiment is similar to Embodiment 6 other than the shape of the source line 42. In the present embodiment, the source line 42 is not a straight line but a zigzag line. The source line 42 is aligned so as to be parallel to the long side of the pixel electrode 2.

In the present embodiment also, the aperture portion 11 of the lower pixel comprises the first region 115 and the second region 114. The second region 114 is not overlapped with the pixel electrode 2. The aperture portion 11A of the upper pixel comprises the first region 115A and the second region 114A. The second region 114A is not overlapped with the pixel electrode 2. In the present embodiment also, the fringe electric fields occurring at the peripheral edge of the first region 115, 115A are directions illustrated in FIG. 19 as seen from the plane. Similarly to Embodiment 3 (FIG. 14B), the fringe electric fields occurring at the most parts of the first region 115 contribute to make the liquid crystal molecules rotate in the normal (counterclockwise) direction. At the upper-right corner and the lower-left corner, which are formed in an acute angle, fringe electric fields that contribute to the reverse rotation of the liquid crystal molecules may occur. However, the fringe electric fields only occur at the vertex portions of the corners. Accordingly, as described in Embodiment 2, it is possible to reduce the occurrence of the reverse rotation domain.

Next, a driving circuit 9 in the liquid crystal display apparatus 1000 will be described. FIG. 21 illustrates a configurational example of the driving circuit 9 in the liquid crystal display apparatus. The driving circuit 9 includes the upper electrode 1, the pixel electrode 2, the lower electrode 3, the source line 42, the gate line 5, a source driver 91, a gate driver 92, an original image signal source 93 and a timing controller 94.

In the liquid crystal display apparatus 1000, pixels are arranged in a matrix by the plurality of gate lines 5 and the plurality of source lines 42. The pixel electrode 2 (see FIG. 1) is provided for each pixel. Accordingly, the pixel electrodes 2 are arranged in a matrix.

The timing controller 94 processes image data and a timing signal obtained from the original image signal source 93 and sends data and a control signal to the source driver 91 and the gate driver 92 so as to drive the source driver 91 and the gate driver 92. The source driver 91 converts the data input from the timing controller 94 and applies image data voltage required for driving pixels to the source line 42. The gate driver 92 applies a control voltage for turning on/off of the TFT (not illustrated) constituting a pixel to the gate line 5. A single line of pixels are selected by the gate line 5, and data writing is performed by the source line 42. The fringe electric fields in accordance with the data written by the source line 42 occur between the pixel electrode 2 and the upper electrode 1, and between the pixel electrode 2 and the lower electrode 3, and by the occurring electric fields, the liquid crystal molecules are driven.

The technical features (components) described in each example embodiment may be combined with one another, and such combinations may form new technical features.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

What is claimed is:

1. A liquid crystal display apparatus comprising:
   a first planar electrode;
   a first insulator layered over an upper surface of the first planar electrode;
   a planar pixel electrode layered over an upper surface of the first insulator;
   a second insulator layered over an upper surface of the planar pixel electrode;
   a second planar electrode that covers the planar pixel electrode and that is layered over an upper surface of the second insulator;
   a liquid crystal layer disposed over an upper surface of the second planar electrode;
   wherein
   the second planar electrode includes an aperture portion including a first region and a second region integrated with the first region,
   the first region is overlapped with both the first planar electrode and the planar pixel electrode,
   the second region is overlapped with the first planar electrode and is not overlapped with the planar pixel electrode, and
   a first angle between a first side of the first region and a first virtual line dividing the aperture portion into the first region and the second region is equal to or smaller than 90 degrees, and
   wherein the aperture portion comprises
   a parallelogram-shaped central portion having long sides parallel to a long side direction of the planar pixel electrode and having first and second short sides;

a first triangular bent portion including the first short side and a first vertex opposite to the first short side, the first vertex not being overlapped with the planar pixel electrode; and a second triangular bent portion including the second short side and a second vertex opposite to the second short side, the second vertex not being overlapped with the planar pixel electrode, and wherein the second region is triangular with one side being the first virtual line of the first region and sharing other sides with the first or second triangular bent portion.

2. The liquid crystal display apparatus according to claim 1, wherein a second angle formed by a second side of the first region and the first virtual line is equal to or greater than 90 degrees.

3. The liquid crystal display apparatus according to claim 1, wherein the aperture portion includes another second region, and
the second region and the another second region are symmetrically disposed.

4. The liquid crystal display apparatus according to claim 1, wherein a plurality of planar pixel electrodes and the second planer electrodes are arrayed in a matrix, and
aperture portions of the second planar electrodes that are adjacent to each other are symmetrically disposed.

5. The liquid crystal display apparatus according to claim 1, the liquid crystal display apparatus further comprising:

a driving circuit configured to apply voltage to the first planar electrode, the second planar electrode and the planar pixel electrode to drive the liquid crystal molecules in the liquid crystal layer, wherein the driving circuit drives the liquid crystal molecules by both an electric field occurred between the first planar electrode and the planar pixel electrode and an electric field occurred between the second planar electrode and the planar pixel electrode.

6. The liquid crystal display apparatus according to claim 1, wherein the first region includes a second long side which is parallel to or tilted at an acute angle with respect to the first long side direction.

7. The liquid crystal display apparatus according to claim 6, wherein a second angle formed by the second side of the first region and the first virtual line is equal to or greater than 90 degrees.

8. The liquid crystal display apparatus according to claim 6, wherein the aperture portion has another second region, and
the second region and the another second region are symmetrically disposed.

9. The liquid crystal display apparatus according to claim 6, wherein a plurality of planar pixel electrodes are arrayed in a matrix, and
aperture portions of the second planar electrodes that are adjacent to each other are symmetrically disposed.

10. The liquid crystal display apparatus according to claim 6, the liquid crystal display apparatus further comprising:

a driving circuit configured to apply voltage to the first planar electrode, the second planar electrode and the planar pixel electrode to drive the liquid crystal molecules in the liquid crystal layer, wherein the driving circuit drives the liquid crystal molecules by both an electric field occurred between the first planar electrode and the planar pixel electrode and an electric field occurred between the second planar electrode and the planar pixel electrode.

11. The liquid crystal display apparatus according to claim 1, wherein the liquid crystal display apparatus further comprises:

a gate line disposed to extend along a short side direction of a pixel; and
a source line disposed to extend along a first long side direction of the pixel,
wherein the liquid crystal layer includes liquid crystal molecules, and
wherein a rubbing direction of the liquid crystal molecules is parallel to or tilted at an acute angle with respect to the first long side direction.

12. The liquid crystal display apparatus according to claim 11, wherein the pixel includes at least the planar pixel electrode and the second planar electrode,
each of the planar pixel electrode and the second planar electrode includes a long side which is parallel to the first long side direction of the pixel and a short side which is parallel to the short side direction of the pixel.

* * * * *